US006722989B1

United States Patent
Hayashi

(10) Patent No.: US 6,722,989 B1
(45) Date of Patent: Apr. 20, 2004

(54) VIRTUAL PET GAME IN WHICH THE VIRTUAL PET CAN CONVERSE WITH THE PLAYER AND LEARN NEW WORDS AND PHRASES FROM THESE CONVERSATIONS

(75) Inventor: Yozo Hayashi, Tokyo (JP)

(73) Assignee: Sony Computer Entertainment Inc., Tokyo (JP)

(*) Notice: Subject to any disclaimer, the term of this patent is extended or adjusted under 35 U.S.C. 154(b) by 0 days.

(21) Appl. No.: 09/414,362

(22) Filed: Oct. 7, 1999

(51) Int. Cl.[7] .................................................. A63F 9/24
(52) U.S. Cl. ........................... 463/43; 463/44; 434/167; 434/185; 704/10
(58) Field of Search .................... 463/44, 43; 434/167, 434/185; 707/530, 531, 532, 533; 704/10

(56) References Cited

U.S. PATENT DOCUMENTS

| | | | | |
|---|---|---|---|---|
| 5,273,294 A | * | 12/1993 | Amanai | 463/24 |
| 5,393,073 A | * | 2/1995 | Best | 463/35 |
| 5,495,557 A | * | 2/1996 | Hyman et al. | 704/272 |
| 5,966,691 A | * | 10/1999 | Kibre et al. | 704/260 |
| 5,971,855 A | * | 10/1999 | Ng | 463/42 |
| 5,971,856 A | * | 10/1999 | Aoyama et al. | 463/43 |
| 6,192,332 B1 | * | 2/2001 | Golding | 704/2 |
| 6,282,508 B1 | * | 8/2001 | Kimura et al. | 704/10 |
| 6,319,010 B1 | * | 11/2001 | Kikinis | 434/169 |
| 6,347,993 B1 | * | 2/2002 | Kondo et al. | 463/1 |

OTHER PUBLICATIONS

Schwartz, Writing Randomly, Sep. 1999, Linux Magazine, http://www.stonehenge.com/merlyn/LinuzMag/col04.html.*

* cited by examiner

*Primary Examiner*—Jessica Harrison
*Assistant Examiner*—Corbett B. Coburn
(74) *Attorney, Agent, or Firm*—Katten Muchin Zavis Rosenman

(57) ABSTRACT

A portable electronic device is selectively connected to a master. Durring conection, a plurality of conversation scripts and associated dictionay are downloaded to provide a video game comprising a virtual pet, which game is capable of being executed independently from the master. The virtual pet is able to provide an interactive conversation with a user by the use of the script programs and a dictionary. In addition, the user is able to teach the virtual pet new words. Attributes of the words are modified when the user teaches the pet the words, and their intended meaning, and durring later conversations. The attributes are modified based upon the responses of a user to questions asked by the pet. The user responds by selection of one of a number of possible replies.

25 Claims, 26 Drawing Sheets

| | ATTRIBUTES WORDS | HUMAN 1812 | FOOD 1814 | CREATURE 1816 | ADJECTIVE 1818 | LIKE 1820 | NEED 1822 | DATE 1824 |
|---|---|---|---|---|---|---|---|---|
| 1802 | CANDY | 0 | 1 | 0 | 0 | 6 | 3 | 19990101 |
| 1804 | JANE | 1 | 0 | 0 | 0 | 4 | 0 | 19990101 |
| 1806 | COKE | 0 | 1 | 0 | 0 | 4 | 2 | 19990101 |
| 1808 | COMPUTER | 0 | 0 | 0 | 0 | -5 | 3 | 19990101 |
| 1810 | COLD | 0 | 0 | 0 | 2 | 0 | 0 | 19990101 |
| | | | | | | | | |
| | | | | | | | | |
| | | | | | | | | |
| | | | | | | | | |

FIG. 18

The Script Program Of Usual Conversation (Title: Dream)

Step1:
Seek a word meaning moving that has a flag meaning a pet (e.g. toro) likes and doesn't have a flag meaning a player likes from the dictionary.

Step2:
Seek a word that has a flag meaning a human and a flag meaning a lover.

Step3:
Display a pet.

Step4:
Display the sentence "Do {player} like (doing) {the word sought by step 1}?"

IF player don't like it,
Step5:
Display the picture a pet being in trouble and the sentence "you don't like (doing) {the word sought in step 1}, but I (toro) like (doing) it well.

Step6:
Seek another word meaning moving that has a flag meaning a pet (e.g. toro) likes and doesn't have a flag meaning a player likes from the dictionary.

Step7:
Display "Next, do you like (doing) {the word sought in step6}"

Step8:
If the player doesn't like the word answered in step7 three times, display "I am pretty sad. Bye bye." And display a pet going away.

If the player likes the word answered in step4 or step7
Step9:
Display the picture a pet being fascinated.

Step10:
Display "What do you feel like, if you are done {the word answered in step4 or step7} by {the word sought in step2?"

Step11:
Display the select menu "absorbedly", "happy", "exciting", "throbbing"

Step12:
Set a parameter selected by the player in step11 to the flag of the word answered in step4 or step7.

Step13:
Display a pet giggling.

Step14:
Display "If I am done {the word answered in step4 or step7} by my lover, I am very happy as same as eating much cake.

Step15:
Display "bye bye" and a pet going away.

FIG. 20

VIRTUAL PET GAME IN WHICH THE VIRTUAL PET CAN CONVERSE WITH THE PLAYER AND LEARN NEW WORDS AND PHRASES FROM THESE CONVERSATIONS

TECHNICAL FIELD

This invention relates to a portable electronic device used as an auxiliary storage device such as a memory card inserted into the master unit of information equipment, as well as an entertainment system such as a entertainment station having a function for storing game data or the like in an auxiliary storage device. More specifically, the present invention relates to an interactive portable electronic device with combined fixed and programmable conversation and related download capabilities.

BACKGROUND ART

A portable electronic device or slave serving as an auxiliary storage device such as a conventional video card used upon being inserted into the master of information equipment such as a entertainment machine is equipped with an interface for making a connection to the console (master) of the information equipment and a non-volatile storage element for storing data.

A conventional memory card according to the prior art has control means for controlling the operation of the memory card, a connector for making a connection to a terminal provided in a slot of information equipment or the like, and a non-volatile memory for storing data. The connector and the non-volatile memory are connected to the control means.

The control means is constituted by a microcomputer, by way of example. A flash memory such as an EEPROM, for example, is used as the non-volatile memory. There are also instances where the interface for the connection to the information equipment or the like employs a microcomputer as control means for interpreting protocols.

The memory card merely has a console connection interface for connection to the console of the information equipment or the like, and a memory interface for input and output of data to and from the non-volatile memory.

Further, the conventional entertainment station such as a TV game station for home use has a function for storing game data and the like in an auxiliary storage device. The above-mentioned memory card is used also as an auxiliary storage device of such a entertainment station.

A conventional entertainment station uses a memory card as an auxiliary storage device. This conventional entertainment station 1 has a console accommodated within a substantially quadrangular case and is constituted by a centrally provided disk mounting unit in which is mounted an optical disk serving as a recording medium on which the application program of a video game has been recorded, a reset switch for resetting the game at will, a power-supply switch, a disk operating switch manipulated for mounting the optical disk, and two slots, by way of example.

The memory card used as an auxiliary storage device is inserted into the slots so that the results of a game, for example, that has been run on the entertainment station, are sent from control means (CPU) and written to the non-volatile memory. An arrangement may also be adopted in which a plurality of control devices (controllers) are connected to the slots, thereby enabling a plurality of users to play competitive games against one another at the same time.

Consideration has been given to providing a slave, which is connected utilizing the memory-card slot of an entertainment station or the like serving as the master, not only with the storage function of an auxiliary storage device but also with a function for executing programs such as games. Such a slave can also be used as a portable electronic device as is, and by making it easy to communicate with other equipment, a wider range of applications can be achieved. This in turn can stimulate new demand.

The present invention, which has been devised in view of these circumstances, has as its object to provide a portable electronic device and an entertainment system, wherein the portable electronic device is capable of being connected to a master, can be used even as a stand-alone slave and readily communicates with other items of equipment. The portable electronic device retains an interactive conversation mode with limited learning capabilities and downloading features.

DISCLOSURE OF INVENTION

A portable electronic device is equipped with an interface for making a connection to a master having a program executing function, the portable electronic device comprising program storage means for storing a program, control means for controlling execution of the program, display means for displaying information in accordance with the program executed, and operation input means for operating the program, wherein a program capable of being executed independently by a slave is transmitted by an operation performed during execution of the program of the master.

Further, a portable electronic device is equipped with an interface for making a connection to a master having a program executing function, the portable electronic device comprising program storage means for storing a program, control means for controlling execution of the program, display means for displaying information in accordance with the program executed, and operation input means for operating the program, wherein an object in the program of the master is moved to display means of a slave by an operation performed during execution of the program.

An entertainment system a master having a program executing function and a slave equipped with an interface for making a connection to the master, wherein the master has control means for transferring information accompanying execution of the program to the slave and for reading in information from the slave, and the slave has program storage means for storing a program, control means for controlling execution of the program, display means for displaying information in accordance with the program executed, and operation input means for operating the program, wherein a program capable of being executed independently by the slave is transmitted by an operation during execution of the program of the master.

Further, the program, capable of being executed independently by the slave, comprises data representing a character. The character data comprises a dictionary and a sentence generator cooperating with the dictionary to form sentences. Upon execution of the program and operation of the portable device, the dictionary is modified by operation of the portable device. The dictionary comprises words and attributes associated with the words which are modified upon operation of portable device.

One implementation of the above system creates a virtual pet. Unlike prior art virtual pets, the present invention virtual pet includes an interactive conversation capability with user customized learning. In addition, the portable device includes various novel downloading and dictionary updating features.

BRIEF DESCRIPTION OF THE DRAWINGS

FIG. 18 is a diagram useful in understanding the assigning of flags to words and attributes;

FIG. 20 illustrates the flow of a script program;

BEST MODE for CARRYING OUT THE INVENTION

A preferred embodiment according to the present invention will now be described with reference to the drawings. A portable electronic device embodying the present invention can be used as a memory card employed in an entertainment system such as a entertainment station serving as the master. The portable electronic device can also be used separately as a hand-held game machine. It should be noted that the master is not limited to an entertainment station and that the portable electronic device serving as the slave need not necessarily have a memory card function.

In the description that follows, the present invention is described in regard to an entertainment station, which is an example of a master in which a portable electronic device embodying the present invention is employed as a slave.

Figure 1:
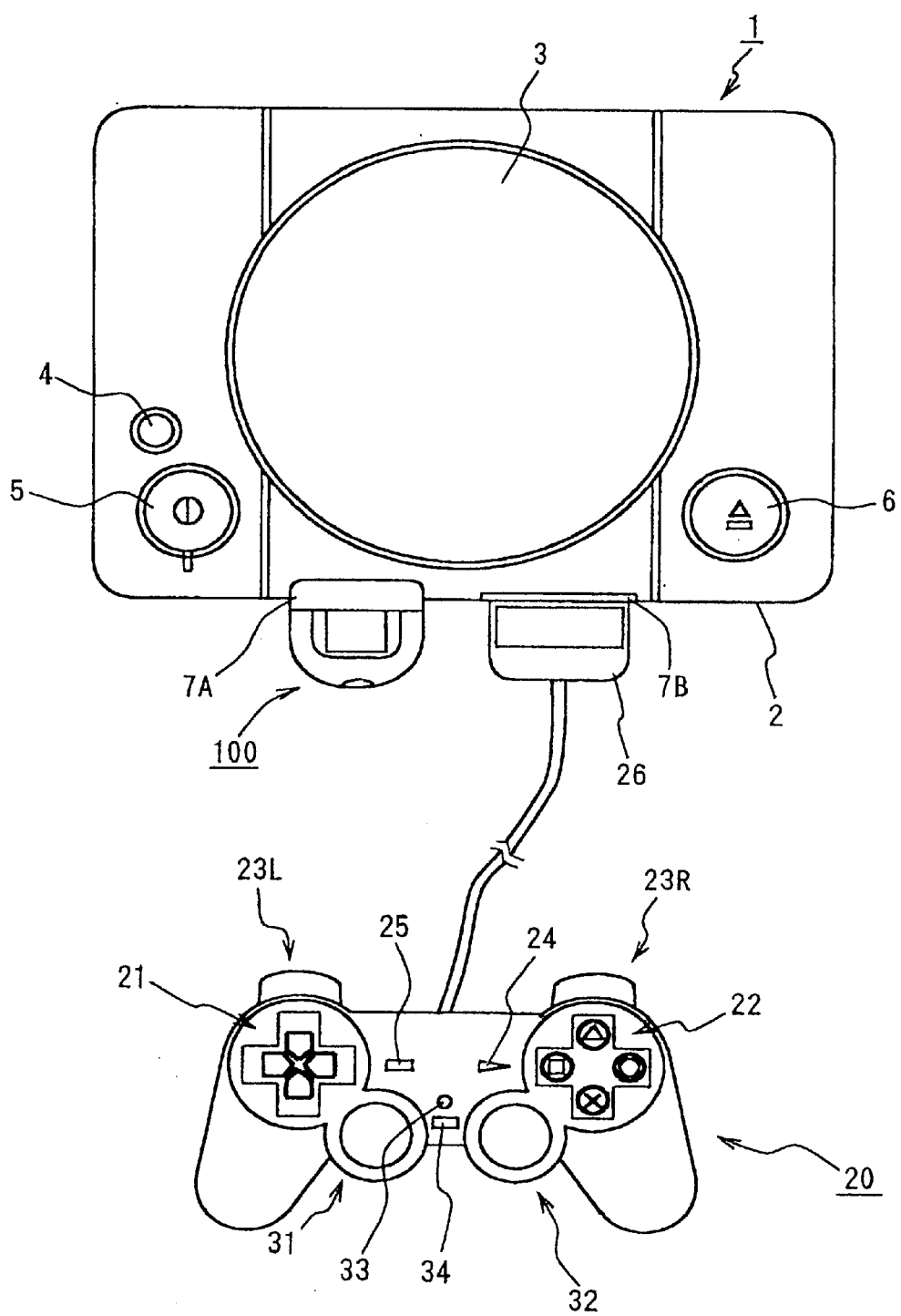
FIG. 1 is a plan view illustrating the appearance of an entertainment system serving as a master in which a portable electronic device is used as a slave according to an embodiment of the present invention.

FIG. 1 shows the appearance of an entertainment station serving as the master in which the electronic device embodying the present invention is inserted. The entertainment station 1 is for reading out a game program that has been recorded on an optical disk or the like and for executing the program in accordance with commands from a user (the player of the game). Executing the game primarily means causing the game to proceed and controlling video and audio that conform to the content of the game.

The entertainment station 1 has a console 2 accommodated within a substantially quadrangular case and is constituted by a centrally provided disk mounting unit 3 in which is mounted an optical disk such as a CD-ROM serving as a recording medium for supplying an application program of a video game or the like, a reset switch 4 for resetting the game at will, a power-supply switch 5, a disk operating switch 6 manipulated for mounting the optical disk, and two slots 7A and 7B, by way of example.

It should be noted that the recording medium for supplying the application program is not limited to an optical disk. Further, an arrangement may be adopted in which the application program is supplied via a communications line.

Two controllers 20 can be connected to the slots 7A, 7B so that two users can play competitive games or the like against each other. The above-mentioned memory card or the portable electronic device embodying the present invention can be inserted into the slots 7A, 7B. Though FIG. 1 exemplifies a structure provided with the slots 7A, 7B of two systems, the number thereof is not limited to two.

The controller 20 has first and second control portions 21, 22 as well as a left button 23L, a right button 23R, a start button 24 and a select button 25. The controller further has control portions 31, 32 capable of analog control, a mode selection switch 33 for selecting the operating mode of the control portions 31, 32, and a display portion 34 for displaying the selected operating mode. Provided within the controller 20 is a vibration imparting mechanism, which is not shown.

Figure 2:
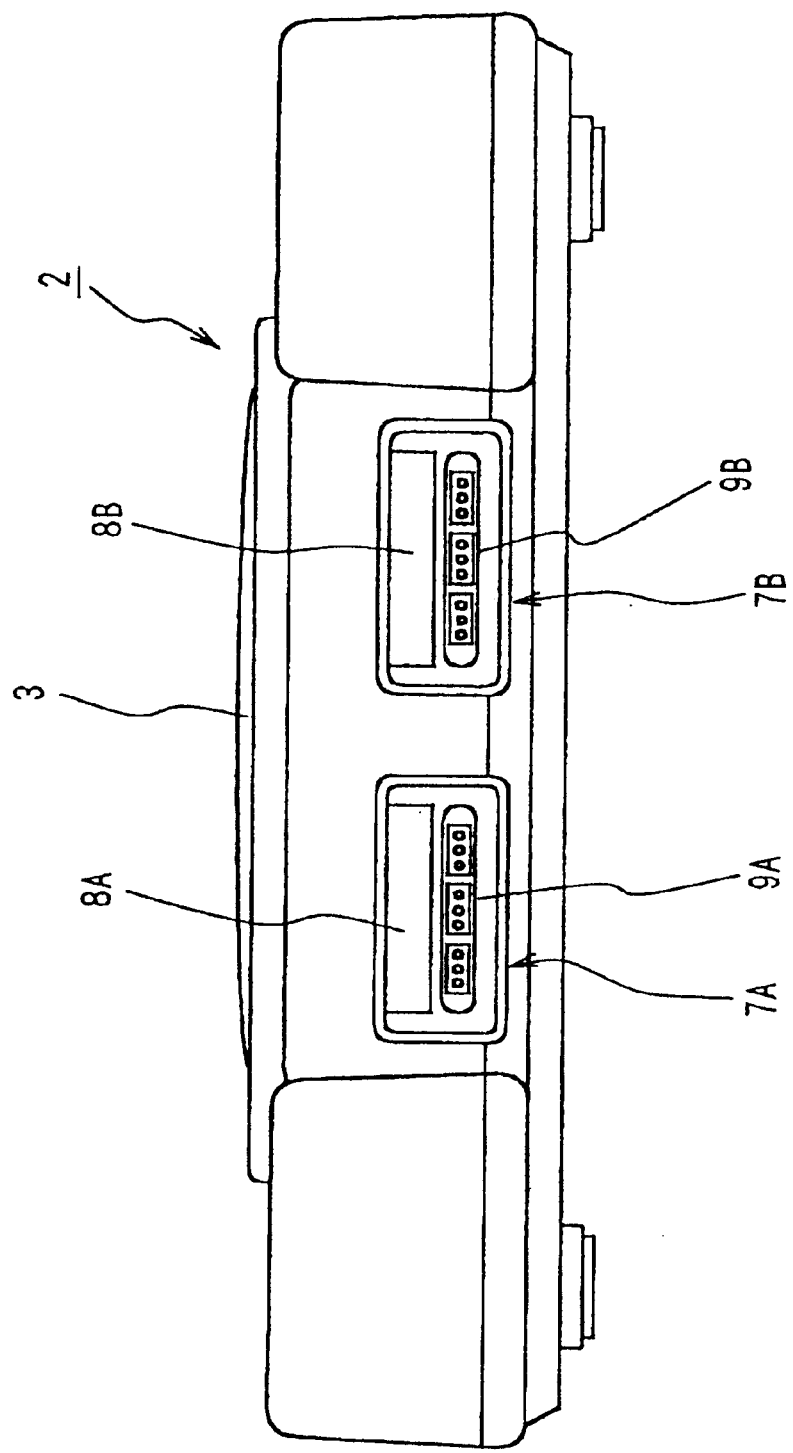
FIG. 2 is a back view showing the appearance of slots in the entertainment station serving as a master.

FIG. 2 shows the appearance of the slots 7A, 7B provided in the front side of the console 2 of entertainment station 1.

According to this embodiment, the slots 7A, 7B are each formed to have two levels. The upper levels of the respective slots are provided with memory card insertion portions 8A, 8B for inserting the above-mentioned memory card 10 or a portable electronic device 100, described later, and the lower levels of the respective slots are provided with controller connecting portions (jacks) 9A, 9B for connecting a connection terminal (connector) 26 of the controller 20.

Structurally, the insertion hole (slot) of each of the memory card insertion portions 8A, 8B is formed to have a transversely elongated rectangular shape, and the corners at both ends on the lower side thereof are made rounder than the corners at both ends on the upper side so that a memory card will not be inserted in the wrong direction. The memory card insertion portions 8A, 8B are provided with shutters which protect the connection terminals provided within the memory card insertion portions for the purpose of obtaining an electrical connection.

Structurally, the controller connecting portions 9A, 9B, on the other hand, each have an insertion hole of a transversely elongated rectangular shape, and the corners at both ends on the lower side thereof are made rounder than the corners at both ends on the upper side, whereby the connection terminal 26 of the controller 20 will not be connected in the wrong direction. The memory card insertion portions 8A, 8B are structured to have insertion holes of different shapes in such a manner that a memory card will not be inserted by mistake.

Figure 3:
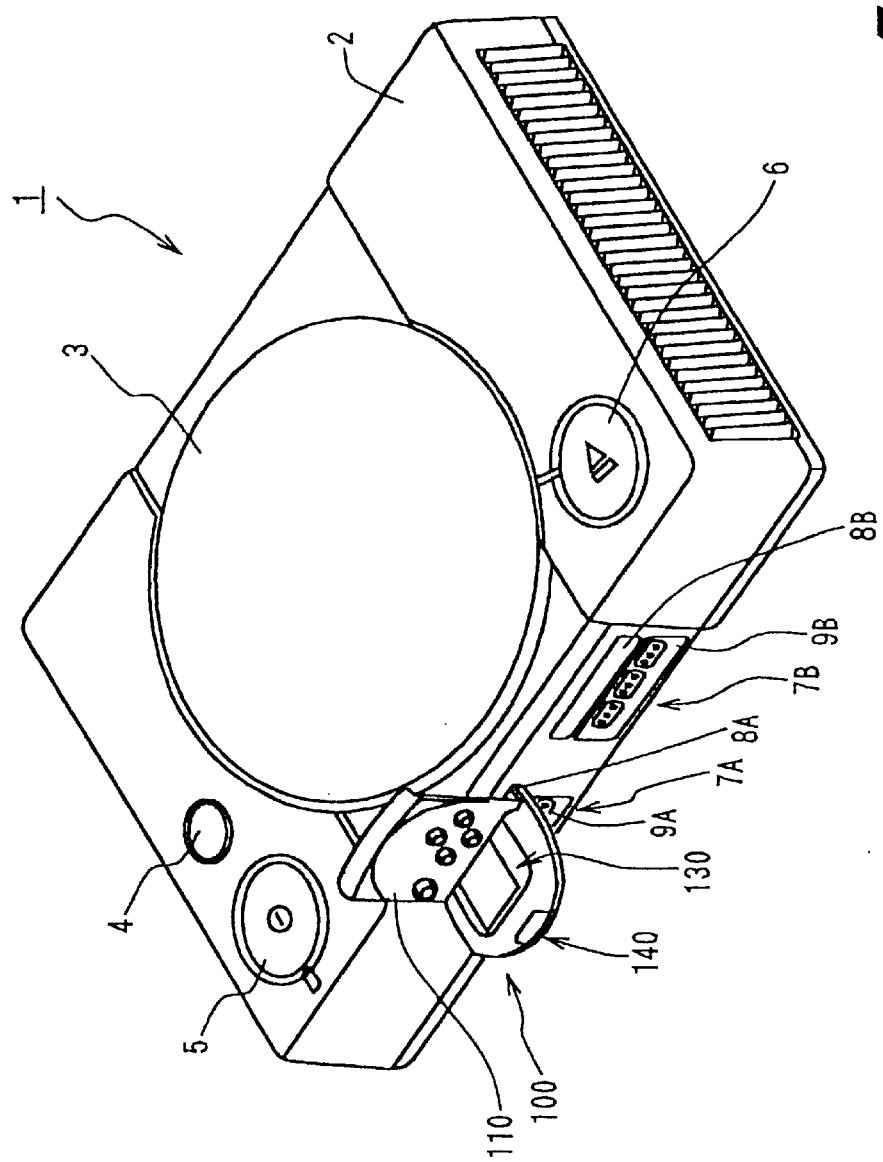
FIG. 3 is an external perspective view showing the appearance of the entertainment station serving as a master.

FIG. 3 shows a state in which the portable electronic device 100 (described later) embodying the present invention has been inserted into the memory card insertion portion 8A of slot 7A in the front side of the entertainment station 1.

Figure 4:
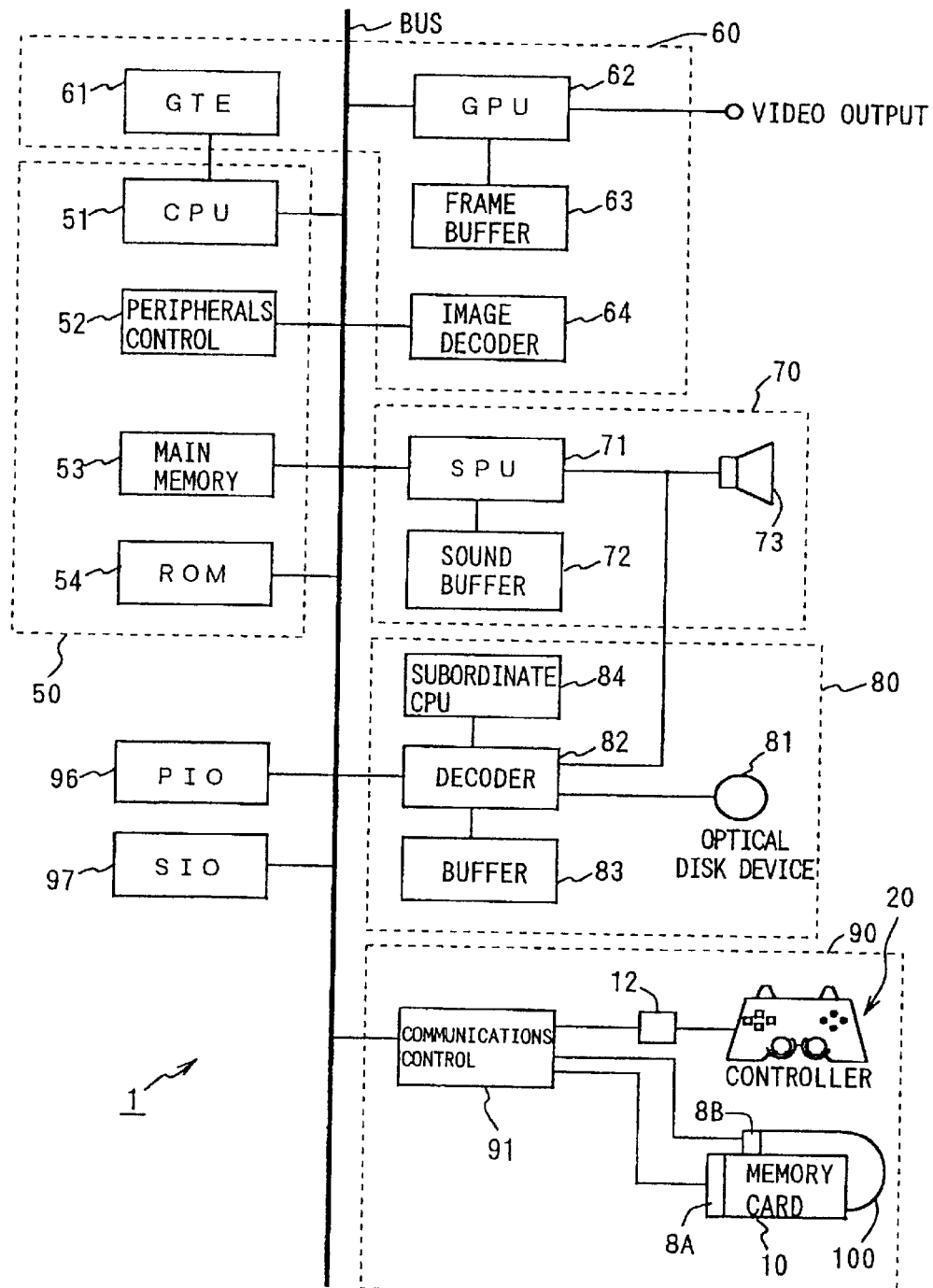
FIG. 4 is a block diagram illustrating a specific example of the arrangement of the principal components of the entertainment station serving as a master.

FIG. 4 is a block diagram showing schematically an example of the circuitry of the principal components of the above-described entertainment station 1.

The entertainment station 1 has a control system 50 comprising a central processing unit (CPU) 51 and its peripherals; a graphics system 60 comprising a graphic processing unit (GPU) 62, etc., for drawing graphics in a frame buffer 63; a sound system 70 comprising a sound processing unit (SPU) 71, etc., for generating music and sound effects, etc.; an optical-disk controller 80 for controlling an optical disk on which an application program has been recorded; a communications controller 90 for controlling input and output of data to and from the memory card 10, which stores signals and game settings from the controller 20 to which commands from the user are input, or portable electronic device 100, described later; and a bus denoted BUS to which each of the foregoing components is connected.

The control system 50 has the CPU 51, a peripherals controller 52 for performing control such as interrupt control and control of direct memory access (DMA) transfer, a main memory 53 comprising a random-access memory (RAM); and a read-only memory (ROM) 54 storing a program such as a so-called operating system that controls the main memory 53, graphic system 60 and sound system 70. The main memory mentioned here refers to a memory in which programs can be executed.

The CPU 51, which performs overall control of the entertainment station 1 by executing the operating system that has been stored in the ROM 54, is constituted by a 32-bit RISC-CPU, by way of example.

When power is introduced to this entertainment station 1, the CPU 51 of the control system 50 runs the operating system stored in the ROM 54, whereby the CPU 51 controls the graphics system 60 and sound system 70, etc. Further, when the operating system is run, the CPU 51 performs initialization of the overall entertainment station 1, such as verification of the operation thereof, and then controls the optical-disk controller 80 to execute an application program such as a game that has been recorded on an optical disk. In response to execution of a program, such as a game, the CPU 51 controls the graphics system 60 and sound system 70, etc., in conformity with inputs from user, thereby controlling the display of images and the generation of sound effects and music.

The graphics system 60 has a geometry transfer engine (GTE) 61 for executing coordinate transformation and the like, the GPU 62 for drawing graphics in accordance with a draw command from the CPU 51, a frame buffer 63 for storing an image drawn by the GPU 62, and an image decoder 64 for decoding image data that has been compressed and encoded by an orthogonal transformation such as a discrete cosine transformation.

The GTE 61, which has a parallel operation mechanism for executing a plurality of arithmetic operations in parallel, is capable of executing a coordinate transformation, light-source calculation and matrix or vector operation, etc., at high speed in response to an operation request from the CPU 51. More specifically, in case of a calculation where one polygon of a triangular shape is subjected to flat shading so as to be rendered in the same color, the GTE 61 is capable of calculating the coordinates of a maximum of 1,500,000 polygons in one second. As a result, the entertainment station is capable of reducing the load upon the CPU 51 and of calculating coordinates at high speed.

The GPU 62 draws polygons and the like in the frame buffer 63 in accordance with a draw command from the CPU 51. The GPU 62 is capable of drawing a maximum of 360,000 polygons in one second.

The frame buffer 63, which comprises a so-called dual-port RAM, is capable of performing simultaneously the transfer of draw data from the GPU 62 or main memory and read-out for displaying what has been drawn. The frame buffer 63, which has a capacity of 1 MB, for example, is treated as a 16-bit matrix composed of 1024 pixels in the horizontal direction and 512 pixels in the vertical direction. Further, besides a display area from which data is output as video, the frame buffer 63 is provided with a CLUT area in which is stored a color look-up table (CLUT) to which reference is had when the GPU 62 draws polygons or the like, and a texture area, in which is stored texture subjected to a coordinate transformation at the time of drawing and then inserted into (mapped to) polygons drawn by the GPU 62. The CLUT area and texture area change dynamically in accordance with a change, etc., in the display area.

Besides performing the flat shading mentioned above, the GPU 62 is capable of executing Gouraud shading, which decides the color in a polygon by interpolation from the colors at the apices of the polygon, and texture mapping, in which texture that has been stored in the texture area is mapped to polygons. In a case where Gouraud shading or texture mapping is carried out, the GTE 61 is capable of calculating the coordinates of a maximum of 500,000 polygons in one second.

Furthermore, under control of the CPU 51, the image decoder 64 decodes image data representing still or moving images stored in the main memory 53, and stores the decoded data in the main memory 53.

The image data thus reproduced is stored in the frame buffer 63 via the GPU 62, whereby the image data is capable of being used as the background of the image drawn by the GPU 62.

The sound system 70 has an SPU 71 for generating music and sound effects based upon a command from the CPU 51, a sound buffer 72 in which data such as waveform data is stored by the SPU 71, and a speaker 73 for outputting music and sound effects, etc., generated by the SPU 71.

The SPU 71 has an ADPCM decoding function for reproducing audio data obtained by adaptive differential PCM (ADPCM) using 16-bit audio data as a 4-bit differential signal, a reproducing function for generating sound effects and the like by reproducing waveform data that has been stored in the sound buffer 72, and a modulating function for modulating and reproducing the waveform data that has been recorded in the sound buffer 72.

Provision of these functions enables the sound system 70 to be used as a so-called sampling sound source, which generates music and sound effects, based upon the waveform data recorded in the sound buffer 72, in response to a command from the CPU 51.

The optical-disk controller 80 has an optical disk device 81 for reproducing programs, data and the like that have been recorded on an optical disk, a decoder 82 for decoding programs, data and the like that have been recorded following assignment of, e.g., error correction codes (ECC) thereto, and a buffer 83 in which data from the optical disk device 81 is stored temporarily, thereby speeding up the read-out of data from the optical disk. A subordinate CPU 84 is connected to the decoder 82.

In addition to ADPCM data, so-called PCM data, which is the result of subjecting an audio signal to an analog-to-digital conversion, is an example of audio data recorded on the optical disk and read out by the optical disk device 81.

As for ADPCM data, audio data that has been recorded using four bits to express, e.g., a 16-bit digital data differential is decoded by the decoder 82, after which the decoded data is supplied to the SPU 71. Here the data is subjected to processing such as a digital/analog conversion and then is used to drive the speaker 73.

As for PCM data, audio data that has been recorded as, e.g., 16-bit digital data is decoded by the decoder 82 and is then used to drive the speaker 73.

The communications controller 90 has a communications controller 91 for controlling communication with the CPU 51 via the bus denoted BUS. The communications controller 91 is provided with controller connecting portions 9A, 9B, to which the controller 20 for entering commands from the user is connected, and with memory card insertion portions 8A, 8B, to which is connected the memory card 10 or portable electronic device 100, described later, serving as an auxiliary storage device for storing game settings data and the like.

The controller 20 connected to the controller connecting portions 9 has, say, 16 instruction keys in order that the user may enter commands. In accordance with a command from the communications controller 91, the controller 20 transmits the states of these instruction keys to the communications controller 91 at a cycle of 60 times per second by synchronous communication. The communications controller 91 transmits the states of the instruction keys of controller 20 to the CPU 51.

As a result, the command from the user is input to the CPU 51 which, on the basis of the game program, etc., currently being run, executes processing that is in accordance with the command from the user.

It is required that a large quantity of image data be transferred at high speed when program read-out, image display and drawing of graphics, etc., are executed among the main memory 53, GPU 62, image decoder 64 and decoder 82. Accordingly, the entertainment station is so adapted that so-called DMA transfer can be carried out for direct transfer of data among the main memory 53, GPU 62, image decoder 64 and decoder 82 by control from the peripherals controller 52 without the intervention of the CPU 51. As a result, the load on the CPU 51 that accompanies data transfer can be alleviated and high-speed data transfer can be performed.

When it is necessary to store setup data of a game currently being run, the CPU 51 transmits the data that is to be stored to the communications control circuit 91.

Upon receiving the data sent from the CPU 51, the communications controller 91 writes the data to the memory card 10 or portable electronic device 100 that has been inserted into the slot of memory card insertion portion 8A or 8B.

It should be noted that the communications controller 91 has a built-in protection circuit to prevent electrical destruction. The memory card 10 and portable electronic device 100, which are separate from the bus denoted BUS, can be inserted and extracted in a state in which the game station console is being supplied with power.

In situations where the storage capacity of the memory card 10 or portable electronic device 100 is no longer adequate, therefore, a new memory card can be inserted without cutting off power to the console. As a result, game data requiring power back-up will not be lost; a new memory card can be inserted and the necessary data can be written to the new memory card.

A parallel I/O interface (PIO) 96 and a serial I/O interface (SIO) 97 are interfaces for connecting the memory card 10 and portable electronic device 100 to the entertainment station 1.

The portable electronic device will be described next. It is assumed below that the portable electronic device 100 according to the present invention is used as a slave upon being inserted into the above-described entertainment station 1 serving as the master.

The portable electronic device 100 serving as the slave is inserted into either of the memory card insertion portions 8A, 8B provided in the slots 7A, 7B, respectively, of the entertainment station 1 serving as the master. Portable electronic devices can be used also as unique memory cards corresponding to a plurality of connected controllers 20. For example, in an instance where two users (game players) play the game, the two portable electronic devices 100 function so that the game results of the individual users are recorded on respective ones of the two portable electronic devices.

The connector of the memory card 10 or portable electronic device 100 is so adapted that the conductor of the connection terminal for the power supply or for ground is formed to be longer than the other terminals in such a manner that the power-supply terminal or ground terminal will form an electrical connection first when the memory card 10 or portable electronic device 100 is inserted into the memory card insertion portions 8A, 8B. This is to ensure the safety and stability of electrical operation. An arrangement may be adopted in which the connection conductors of the memory card insertion portions 8A, 8B provided in the entertainment station 1 are formed to be longer, or in which both of the conductors are formed to be longer.

Further, the connector portions are formed to have left/right asymmetry in order to prevent erroneous insertion.

Figure 5:
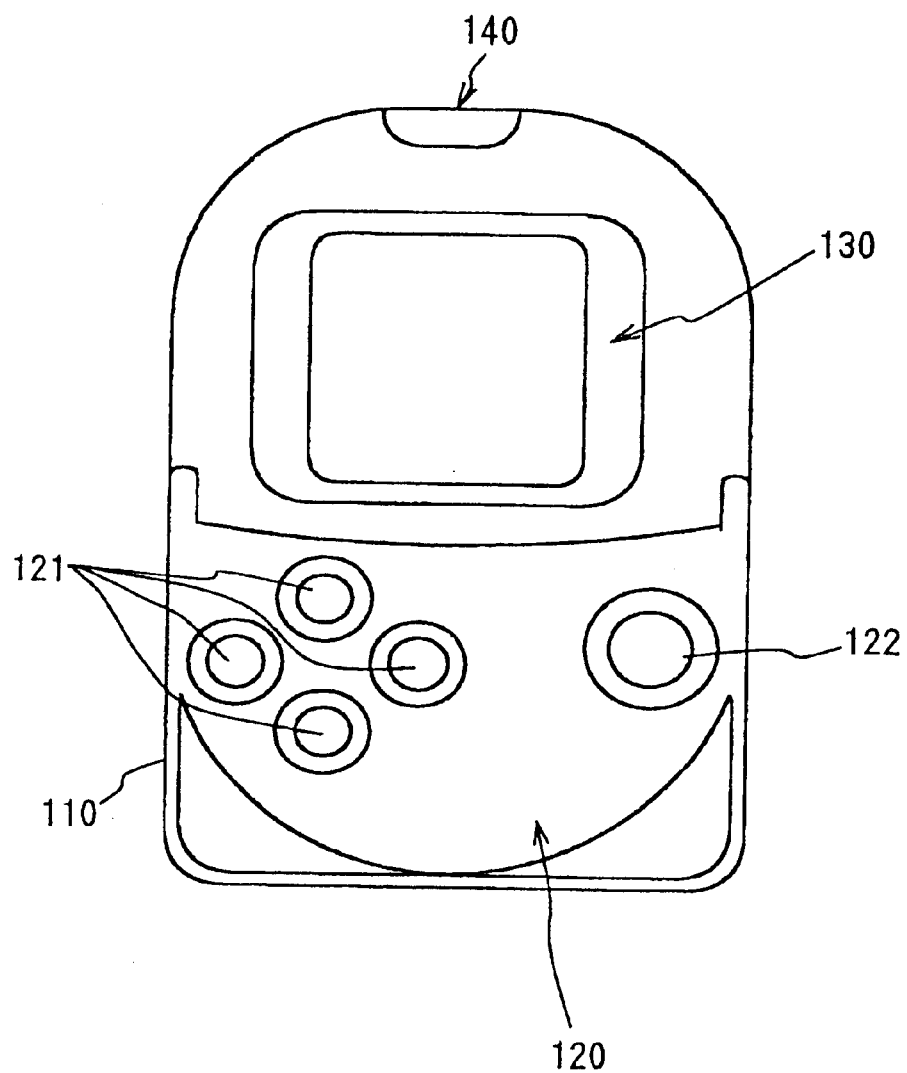
FIG. 5 is a plan view illustrating the appearance of an embodiment of portable electronic device according to the present invention.
Figure 6:
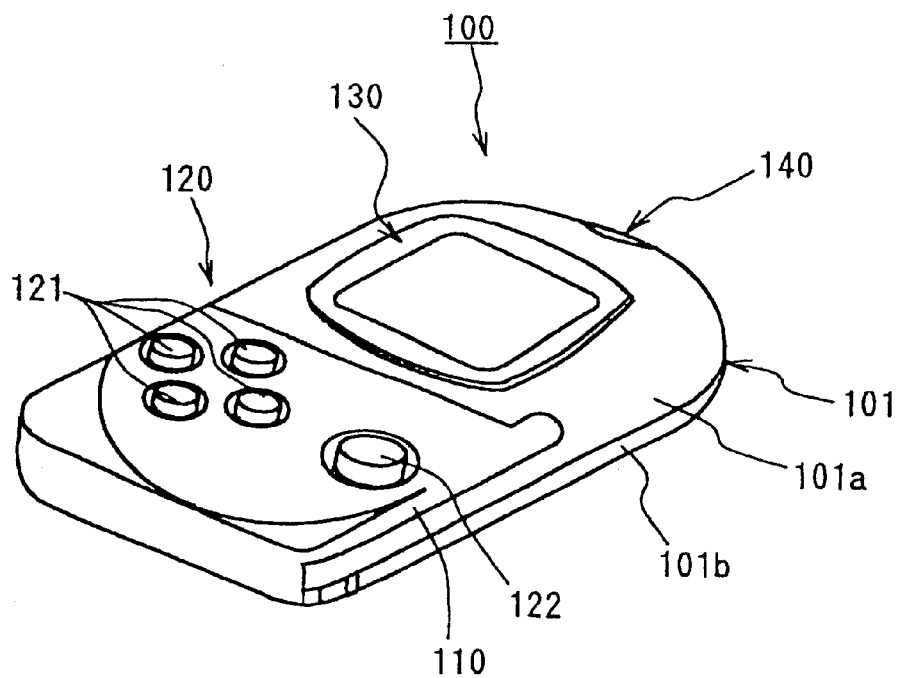
FIG. 6 is a perspective view showing the appearance of the embodiment of portable electronic device according to the present invention.
Figure 7:
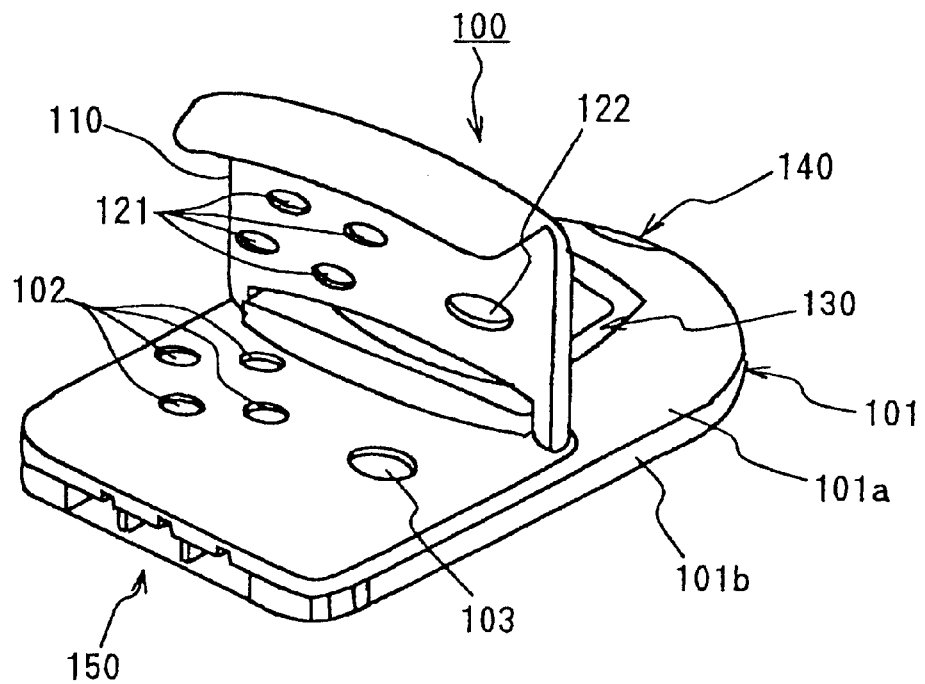
FIG. 7 is a perspective view showing a portable electronic device in the opened state of a cover member in the embodiment of the portable electronic device according to the present invention.

FIGS. 5 to 7 illustrate the appearance of the portable electronic device 100, in which FIG. 5 is a plan view of the portable electronic device 100, FIG. 6 a perspective view in which a cover member 110 for protecting the connector portion is shown in the closed state, and FIG. 7 a perspective view showing the cover member 110 in the open state.

As shown in FIGS. 5 to 7, the portable electronic device 100 has a housing 101. The housing 101 is provided with an operating section 120 having one or a plurality of operating elements 121, 122 for entering events and making various selections, a display section 130 comprising a liquid crystal display device (LCD), and a window 140 for performing wireless communication, as by infrared, by wireless communications means, described later.

The housing 101 comprises an upper shell 101a and a lower shell 101b and houses a substrate 151 mounting memory devices and the like. The housing 101 is capable of being inserted into the slots 7A, 7B in the console of the entertainment station 1. The base end of the housing has a side face provided with a connector portion 150 formed to have a rectangular-shaped opening.

The window 140 is provided in the generally semicircular other end of the housing 101. The display section 130 is provided at a position in the vicinity of the window 140 on the top side of the housing 101 and occupies an area that is approximately half of the top side. The operating section 120 is provided at a portion opposite the window 140 on the top side of the housing 101 and occupies an area that is approximately half of the top surface. The operating section 120 has a substantially quadrangular shape and is constituted by a cover member 110, which is pivotally supported on the housing 101 and has one or plurality of operating elements 121, 122, and switch pushers 102, 103 provided at a position opened and closed by the cover member 110 on housing 101.

The operating elements 121, 122 are disposed passing through the cover member 110 from its upper to its lower side. The operating elements 121, 122 are supported on the cover member 110 in such fashion as to be movable in a direction in which they recede from the top side of the cover member 110.

The switch pushers 102, 103 have pushing elements supported on the housing 101 in such fashion as to be movable in a direction in which they recede from the top side of the cover housing 101. By pushing the pushing elements from above, push switches such as diaphragm switches disposed on the substrate 151 in the housing 101 are pushed.

The switch pushers 102, 103 are provided at positions corresponding to the positions of the operating elements 121, 122 when the cover member 110 is closed. More specifically, when the operating elements 121, 122 are pushed from above in a direction in which they recede from the top side of the cover member 110 in the closed state, the operating elements 121, 122 push the corresponding push switches in the housing 101 via the pushing elements of the corresponding switch pushers 102, 103.

Figure 8:
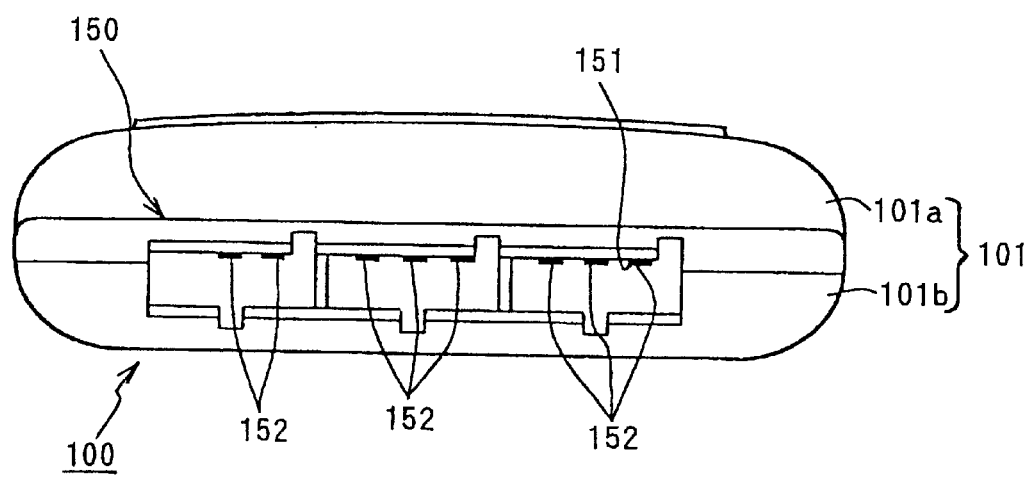
FIG. 8 is a front view showing the appearance of an embodiment of the portable electronic device according to the present invention.

As shown in FIG. 8, power and signal terminals 152 are disposed on the substrate 151 within the window of the connector portion 150.

The shape, dimensions, etc. of the connector portion 150 are common with those of the ordinary memory card 10 used with the entertainment station 1.

Figure 9:
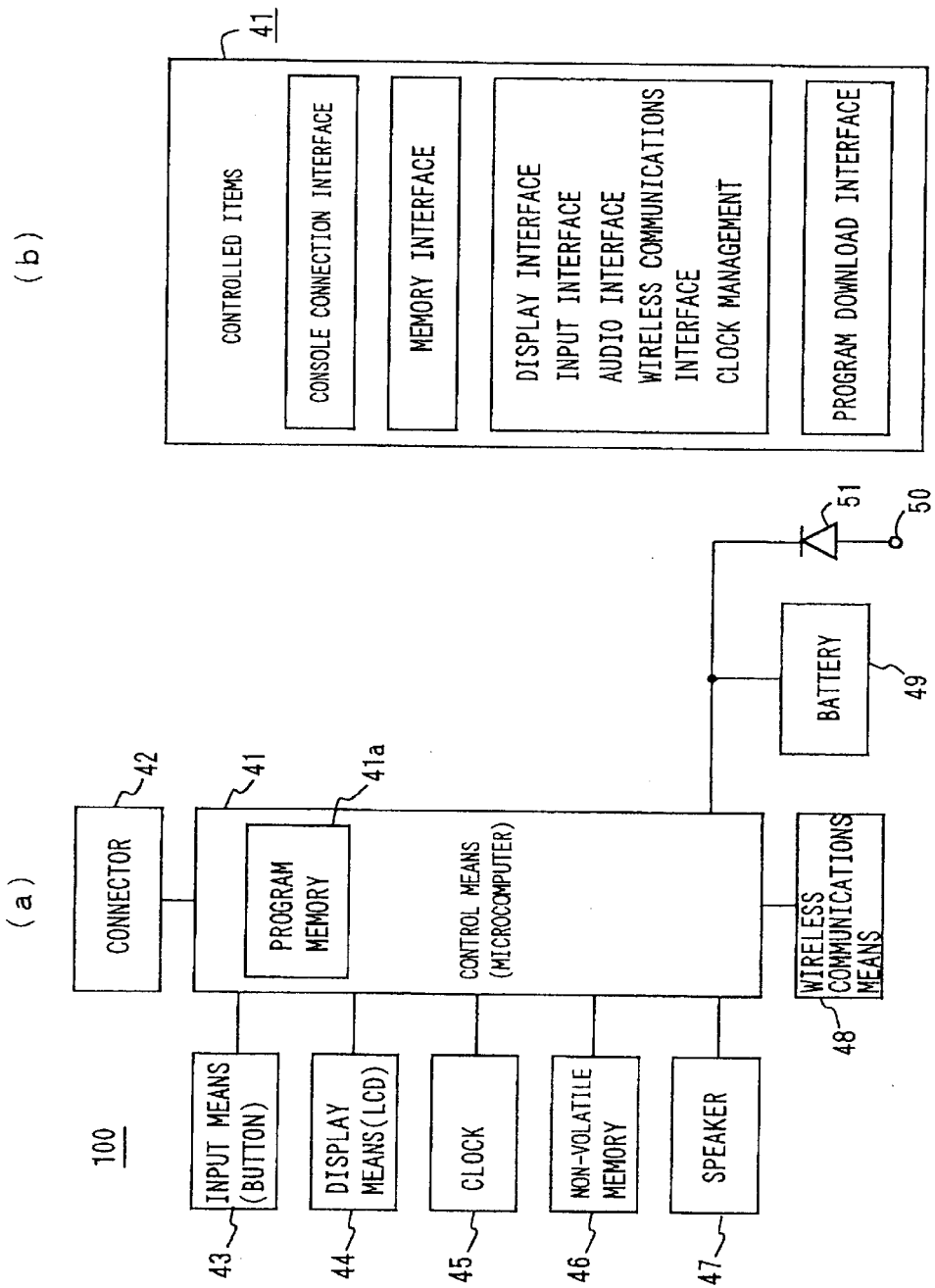
FIG. 9 is a block diagram showing an example of the arrangement of the principal components of the embodiment of the portable electronic device according to the present invention.

FIG. 9(a) is a block diagram showing an example of the arrangement of the principal components of the portable electronic device.

In a manner similar to the ordinary memory card 10 described above, the portable electronic device 100 has control means 41 for controlling its operation, a connector 42 for effecting a connection to a slot of information equipment or the like, and a non-volatile memory 46 serving as a device for storing data.

The control means 41, which is constituted by, say, a microcomputer, has an internally provided program memory 41a. A semiconductor memory device in which the state of recorded data remains intact even when power is cut off, as in the manner of a flash memory, is used as the non-volatile memory 46. It should be noted that because the portable electronic device 100 according to the present invention is configured to be equipped with a battery 49, as will be described later, a static random-access memory (SRAM) capable of high-speed input/output of data can be used as the non-volatile memory 46.

The portable electronic device 100 differs in that, in addition to the components mentioned above, it has operation (event) input means 43 such as operating buttons for operating a stored program, display means 44 such as a liquid crystal display device (LCD) serving as display means for displaying various information in conformity with the above-mentioned program, wireless communications means 48 for sending data to and receiving data from another memory card or the like by infrared radiation, and a battery 49 for powering each of the foregoing components.

The portable electronic device 100 internally accommodates a miniature battery 49 as power supply means. This means that the portable electronic device is capable of operating independently even if it has been pulled out of the slots 7A, 7B of the entertainment station 1 constituting the master. A rechargeable secondary cell may be used as the battery 49. It is so arranged that power is supplied from the entertainment station 1 serving as the master when the portable electronic device 100 serving as the slave has been inserted into either of the slots 7A, 7B of the entertainment station 1 serving as the master. That is, a power-supply terminal 50 is connected to the connection terminal of the battery 49 via a diode 51 for preventing reverse current. When the portable electronic device has been connected by insertion into the slot of the master, such as the entertainment station 1, power is supplied from the master to the slave. Furthermore, in a case where a secondary cell is being used, charging of the secondary cell also takes place.

The portable electronic device 100 further includes a clock 45 and a speaker 47, which serves as sound generating means for generating sound in conformity with the program. It should be noted that the above-mentioned components are all connected to the control means 41 and operate in accordance with control exercised by the control means 41.

FIG. 9(b) illustrates the items controlled by the control means 41. Though the only interfaces with which the ordinary memory card 10 is equipped are the interface for the connection to the console of the information equipment and the memory interface for input/output of data with respect to memory, the portable electronic device 100 of this embodiment has, in addition to these interfaces, a display interface, an operation-input interface, an audio interface, a wireless communications interface, a clock interface and a program-download interface.

Thus, the interfaces (drivers) for managing the functions added on by the present embodiment are provided in the control means (microcomputer) 41 independently of the console (master) connection interface and independently of non-volatile memory management, which are the conventional functions. For this reason compatibility with the conventional functions can be maintained.

Further, since the portable electronic device 100 has the input means 43, such as a button switch, for operating an executed program, and the display means 44 using the liquid crystal display device (LCD) or the like, the portable electronic device 100 is capable of being used as a hand-held game machine for running a game application.

Moreover, since the portable electronic device 100 possesses a function for storing application programs, which are downloaded from the console of the entertainment station 1, in the program memory 41a in microcomputer 14, application programs can be run on the portable electronic device 100. The stored application programs and various types of driver software can be altered with facility.

The portable electronic device 100 according to this embodiment can be controlled independently of the entertainment station 1, as described above. On the side of the portable electronic device 100, therefore, data based upon an application program that has been stored in the program memory 41a serving as the program storage means can be created independently of the application software on the side of the entertainment station 1. By exchanging this data with the entertainment station 1, the portable electronic device 100 and the entertainment station 1 are capable of cooperative (linked) operation.

Furthermore, the fact that the portable electronic device 100 is equipped with the clock 45 makes it possible for time data to be shared with the entertainment station 1. In other words, not only is mutual time data made to coincide but both the entertainment station and the portable electronic device also share data that is for controlling, in real time, the progress of games that are run on them independently.

A specific example of the cooperative operation between the entertainment station 1 and portable electronic device 100 will be described later.

Figure 10:
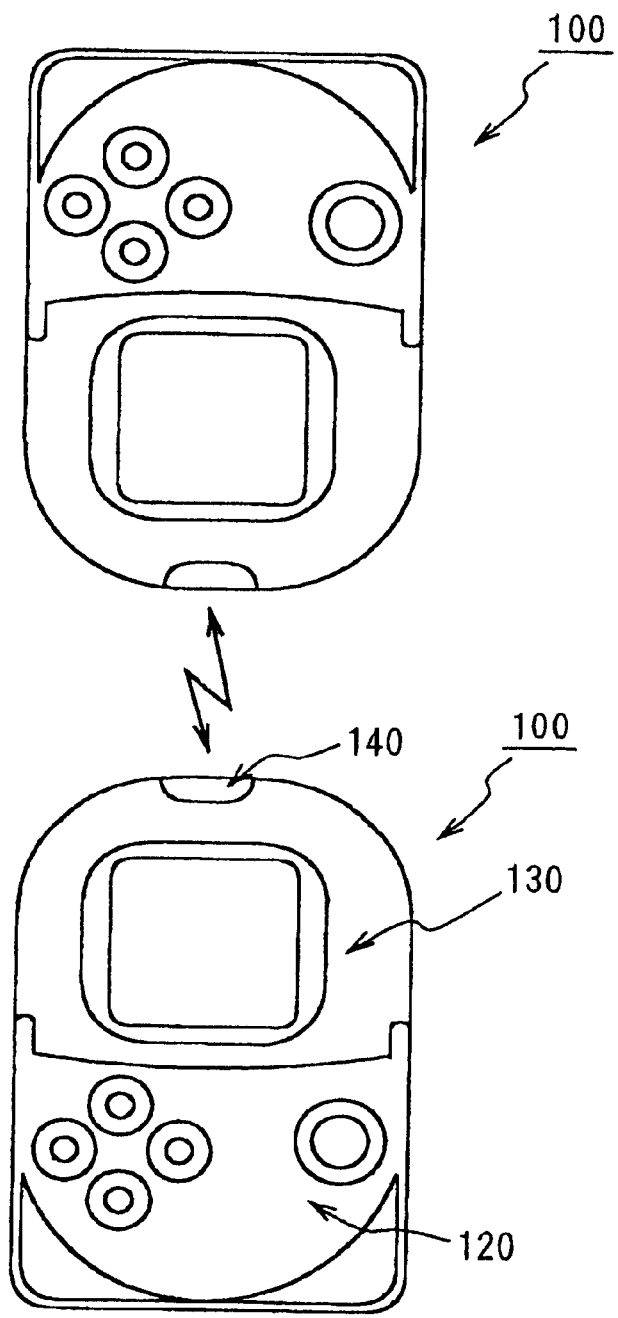
FIG. 10 is a diagram useful in describing a wireless communication function of the embodiment of the portable electronic device according to the present invention.

FIG. 10 illustrates schematically the manner in which wireless communication is performed between portable electronic devices 100 according to the present invention. By thus utilizing the wireless communications means 48, the portable electronic device 100 can exchange internal data with a plurality of memory cards by sending and receiving data via the window 140, which is a wireless communication window for performing wireless communication by infrared or the like. The internal data includes also data that has been transferred from the side of information equipment, such as the entertainment station, and stored in storage means within a memory card.

In the embodiment set forth above, the portable electronic device 100 is described as being used as the auxiliary storage device of a entertainment station. However, the object of application is not limited to a entertainment station, and the device is of course applicable to, e.g., the retrieval of various information.

The invention will now be described in regard to cooperative operation between the portable electronic device 100 and the entertainment station 1 serving as the master.

As mentioned above, the portable electronic device 100 and the console of entertainment station 1 can share game data generated by the microcomputer 41 serving 110 as control means, time data obtained by the clock 45 in the memory card, and data generated by another memory card and obtained via the wireless communications means 48, etc.

Figure 11:
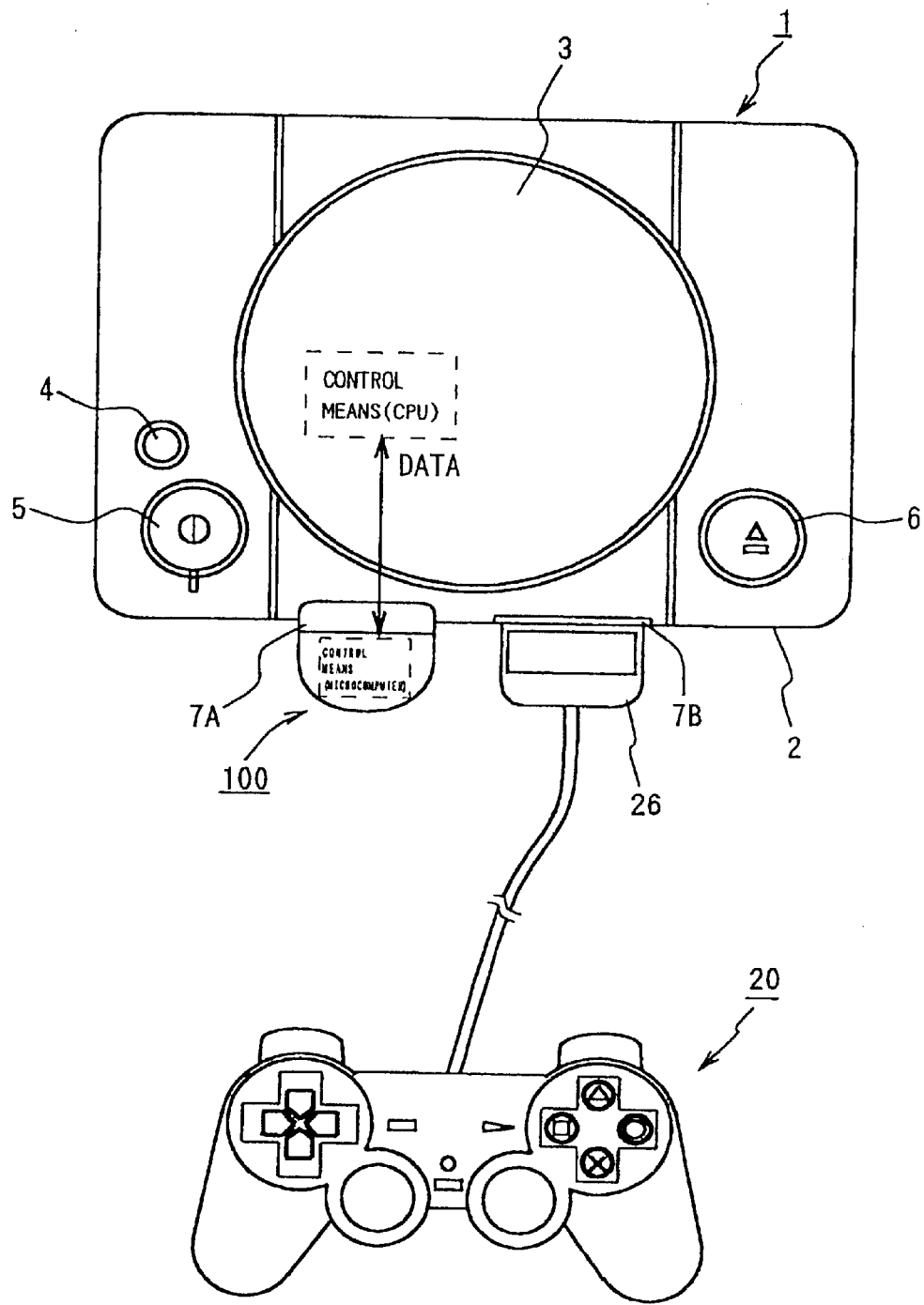
FIG. 11 is a diagram useful in describing cooperative operation between a slave which is an embodiment of the portable electronic device according to the present invention and the console of the entertainment station serving as the master.

FIG. 11 illustrates schematically the manner in which the entertainment station 1 serving as the master and the portable electronic device 100 serving as the slave perform a cooperative operation.

Described below as an example of such cooperative operation is a case where an optical disk (CD-ROM), which is a recording medium on which an application software program has been recorded, has been loaded in the entertainment station 1 serving as the master, and the program read out of the disk is downloaded to the portable electronic device 100 serving as the slave inserted into either of the slots 7A, 7B of the console of the entertainment station 1.

Downloading of a program on the assumption that it is for performing a cooperative operation will be discussed before giving a specific description regarding the cooperative operation.

Figure 12:
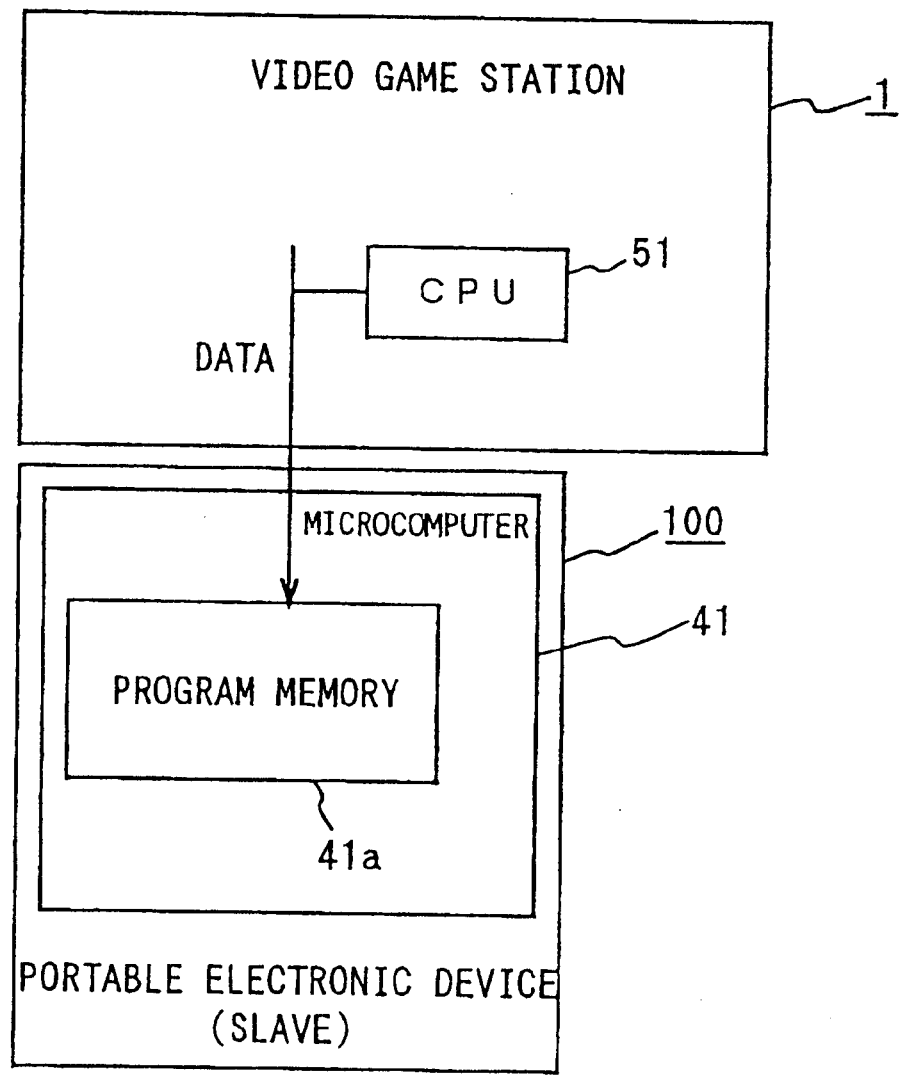
FIG. 12 is a diagram showing the flow of program data downloaded from the entertainment station console (master) to the portable electronic device (slave)

FIG. 12 illustrates the flow of data in an instance where the application program of a video game supplied from an optical disk (CD-ROM), etc., mounted on the disk mounting unit 3 of the master entertainment station 1 is transferred directly (downloaded) to the program memory 41a serving as program storage means in the microcomputer 41, which is the control means of the portable electronic device 100 serving as the slave, via the control means (CPU) 51 of entertainment station 1.

Figure 13:
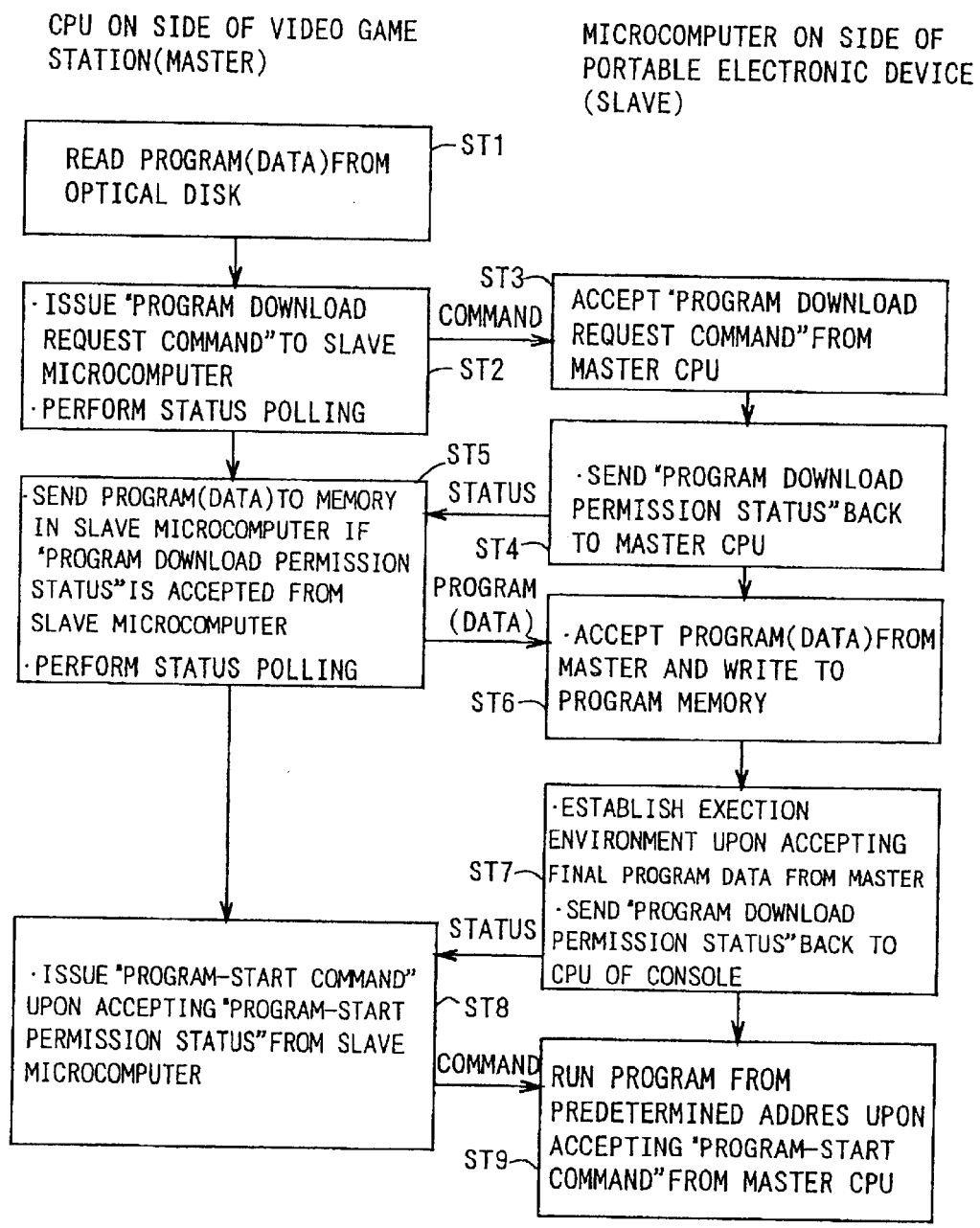
FIG. 13 is a flowchart showing the download procedure of FIG. 12.

FIG. 13 illustrates the download procedure of FIG. 12. At step ST1, the application program of a video game that runs on the microcomputer in the slave portable electronic device 100 (referred to simply as the "slave" hereafter) is read as data out of the CD-ROM that has been mounted on the disk mounting unit 3 of the master entertainment station 1 (referred to simply as the "master" hereafter). As mentioned earlier, this application program generally is different from that which runs on the master entertainment station 1.

Next, at step ST2, the CPU 51 serving as the control means of the master issues a "program download request command" to the microcomputer 41 serving as the control means of the slave portable electronic device 100. The CPU 51 performs polling in order to accept "program download permission status" from the microcomputer 41. The polling mentioned here refers to a method of performing a service upon inquiring as to whether the service has been requested or not.

The microcomputer 41 of the portable electronic device 100 serving as the slave accepts the "program download request command" from the CPU 51 of the master at step ST3.

When the microcomputer 41 on the slave side ends the routine currently being processed and a state in which program download can be executed is attained, the microcomputer sends "program download permission status" back to the CPU 51 of the master at step ST4.

Next, upon accepting "program download permission status" from the microcomputer 41 on the slave side at step ST5, the CPU 51 of the master transfers (downloads) and writes the program, which was read out of the CD-ROM at step ST1, to the program memory 41a serving as the program storage means of portable electronic device 100. The CPU 51 performs polling in order to accept "program-start permission status" from the microcomputer 41.

The address of the program memory 41a to which the downloaded data is written is managed by the microcomputer 41 of the slave at this time. In the description rendered above, a case in which the program downloaded from the master is stored in the program memory 41a within the microcomputer 41 is taken as an example. However, an arrangement may be adopted in which the program is stored in a storage device such as an SRAM that is capable of inputting and outputting data at high speed.

The microcomputer 41 of the memory card accepts as data the program that has been transferred from the master and writes this data to the program memory 41 a at step ST6. From the point of view of the CPU 51 of the master, it appears that the program data is being written directly to the program memory 41a of the portable electronic device 100 serving as slave. In addition, the address of the program memory 41 a is managed by the microcomputer 41.

Upon accepting the final program data from the master and then establishing an environment in which the program can be executed, the microcomputer 41 of the portable electronic device 100 sends "program-start permission status" back to the CPU 51 of the console at step ST7.

The CPU 51 of the master accepts "program-start permission status" from the microcomputer 41 of the portable electronic device 100 and issues a "program-start command" at step ST8.

Upon receiving the "program-start command" from the CPU 51 of the master, the microcomputer 41 of the portable electronic device 100 starts running the program from a predetermined starting address.

By way of the foregoing procedure, the application program is transferred directly (downloaded) from the master entertainment station 1 to the program memory 41a in the microcomputer 41 of the portable electronic device 100 serving as the slave that has been inserted.

As mentioned above, the means which supplies the application program is not limited to a storage medium such as the optical disk, and an arrangement in which it is supplied via a communication line may be adopted. Only step ST1 would differ in the above-described procedure in such case.

It should be noted that the foregoing download procedure has been described for a case where the application program is downloaded directly from the entertainment station 1 of the master to the program memory 41a in the microcomputer 41 of serving as the control means of the portable electronic device 100 slave that has been inserted.

By contrast, there is also a case where the CPU 51 of the master downloads the data of an application program to the non-volatile memory 46 in the slave portable electronic device 100, after which this data is copied to the program memory 41a in the microcomputer 41, where the program is then executed.

Figure 14:
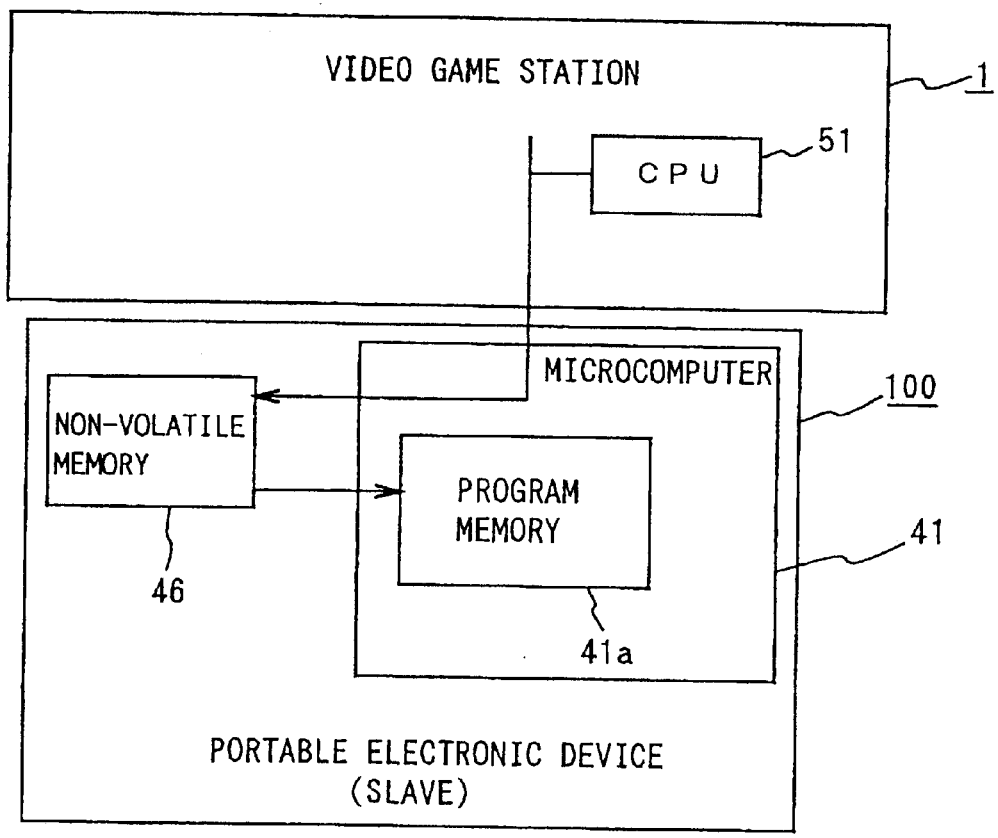
FIG. 14 is a diagram showing another flow of program data downloaded from the entertainment station console (master) to the portable electronic device (slave)

FIG. 14 illustrates the flow of data in such case. Specifically, the application program of a video game supplied from an optical disk or the like mounted on the disk mounting unit 3 of the master entertainment station 1 is transferred (downloaded) to the non-volatile memory 46 in the portable electronic device 100 serving as the slave via the CPU 51 serving as the control means of the entertainment console 1, after which the program is copied to the program memory 41a in the microcomputer 41 and executed.

Figure 15:
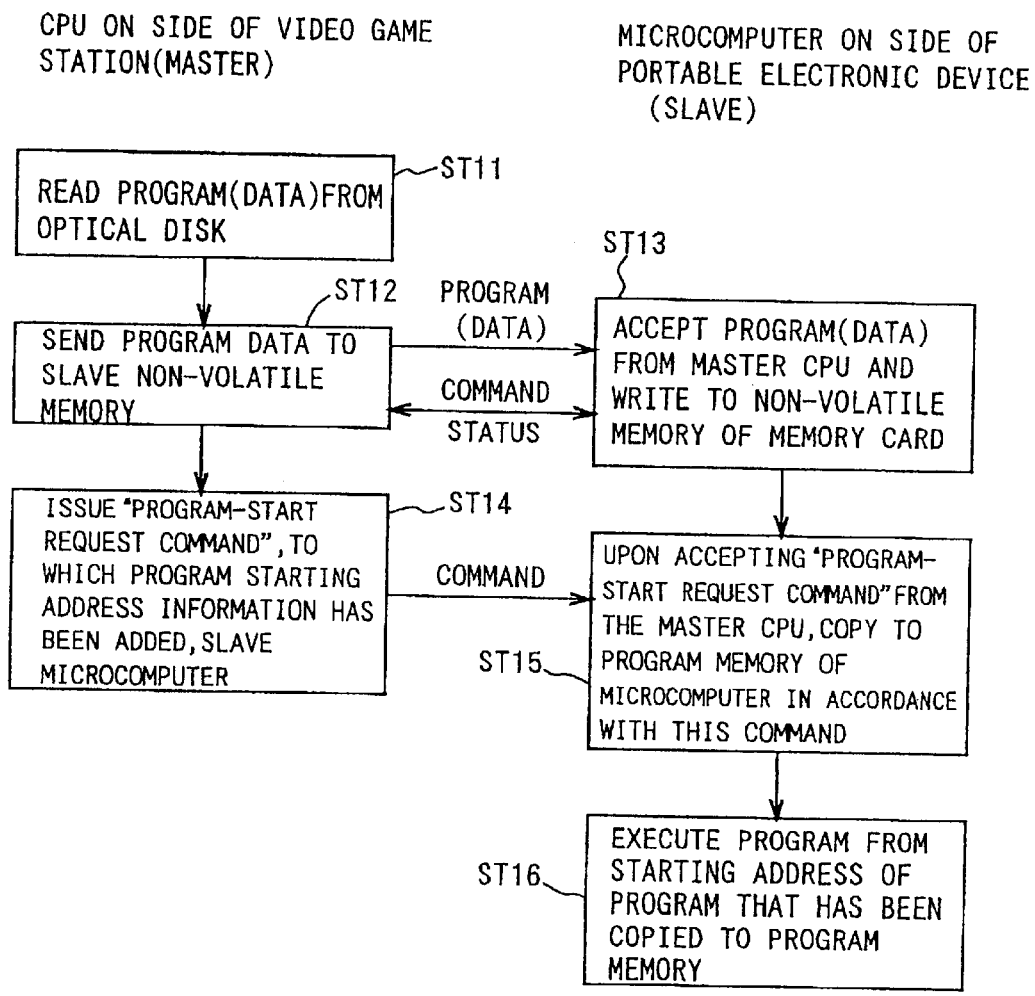
FIG. 15 is a flowchart showing the procedure of the download depicted in FIG. 14.

FIG. 15 illustrates the download procedure.

At step ST1, the application program of a video game that runs on the microcomputer in the portable electronic device 100 serving as the slave is read as data out of the CD-ROM that has been mounted on the disk mounting unit 3 of the entertainment station 1 serving as the master.

Next, at step ST12, the CPU 51 of the master transfers (downloads) the program data read out of the CD-ROM to the non-volatile memory 46 of the portable electronic device 100 serving as the slave. This procedure is similar to that of the case where data is backed up in the conventional entertainment station.

Next, at step ST13, by means similar to that for conventional data backup, the microcomputer 41 serving as the control means of the portable electronic device 100 accepts as data the application program that has been transferred from the CPU 51 of the master and writes this data to the non-volatile memory 46.

This is followed by step ST14 where, upon receiving a "program-start request command" from the CPU 51 of the master, the microcomputer 41 of the portable electronic device 100 copies data of a designated size from an address of the non-volatile memory 46 designated by the above-mentioned command to the program memory 41a in the microcomputer 41.

The microcomputer 41 of the portable electronic device 100 executes the program, which was copied to the program memory 41a, from the starting address of this memory.

By way of the foregoing procedure, the program of the application software is transferred (downloaded) as data, via the non-volatile memory 46, from the master entertainment station 1 to the program memory 41a in the microcomputer 41 of the portable electronic device 100 that has been inserted.

It should be noted that the application program downloaded from the entertainment station 1 to the portable electronic device 100 generally is different from that which runs on the master entertainment station 1. Of course, the above-mentioned downloaded application program may be one that runs on both the entertainment station 1 and the portable electronic device 100. In such case, however, a constraint imposed is that the CPU on the side of the entertainment station 1 and the microcomputer on the side of the portable electronic device 100 be identical processors.

Described next will be cooperative operation performed while the application software that has been downloaded from the master entertainment station 1 through the foregoing procedure is executed in the slave portable electronic device 100 independently and the result of execution is again exchanged with the entertainment station 1.

Here attribute data of personages or characters that appear in a so-called role-playing game that runs on the entertainment station 1 of the master is downloaded to the portable electronic device 100 of the slave. The attribute data is data that represents extent of growth, personality, etc.

By nurturing the appearing personages or characters in the program executed by the microcomputer 41 within the slave portable electronic device 100, the attributes thereof are caused to change independently of the program executed by the console of the entertainment station 1 serving as the master.

The portable electronic device 100 embodying the present invention is configured so as to operate independently and, moreover, is small in size and convenient to carry about. As a result, the personages and characters that make an appearance owing to the program run on the portable electronic device 100 can be carried about and nurtured by the user (the player of the game) at any time. The attributes of the appearing personages and characters nurtured under the care of the user can also be transferred (uploaded) from the portable electronic device 100 to the console of entertainment station 1 by the user. In this case the appearing personages and characters whose attributes have been changed can be incorporated in the program being run on the master entertainment station 1 and made to act in the program.

Thus, as described above, it is possible to implement a video game in which cooperative operation can be carried out by sharing the attribute data of personages and the like with both the entertainment station 1 constituting the master and portable electronic device 100 constituting the slave and by causing the attribute to change in each of these devices.

Having described the preferred environment to practice the principles of the present invention, a game embodying the present invention, using the above-mentioned entertainment station 1 serving as the master and the portable electronic device 100 serving as the slave, will be described in detail. For the sake of simplicity, the entertainment station 1 shall be referred to simply as the "master" and the portable electronic device 100 as the "slave" below.

Generally, the game embodying the present invention has a character (a virtual pet), which is nurtured by a user. Attributes associated with the virtual pet are exchanged between the master 1 and slave 100 as previously described. Specifically, the game enables the user to have a real time conversation with the virtual pet, while also teaching the virtual pet new words. For example, the user enters the word "candy." The virtual pet then asks the user a few questions about the word candy, such as, "What is candy?" and the user is presented with a list of categories. The user chooses one of the categories, such as food. The virtual pet enters the information as an attribute for that word. In addition to the initial questions asked by the pet, the pet uses the word in later conversations and records more attributes for the word. By the additional attributes, the capabilities of the pet using the word are enhanced. The attributes associated with the words a pet knows are grouped as a dictionary. The dictionary and other attributes associated with the pet are exchanged between the master 1 and the slave 100.

Preferably, the game has a plurality of pets from which the user chooses. The user inserts the slave 100 into the master 1, selects the pet they want, and enters additional information such as a name for the pet and user information including the users' name, etc. Portions of the attributes and information associated with the chosen virtual pet are then downloaded to the slave 100.

Figure 16:
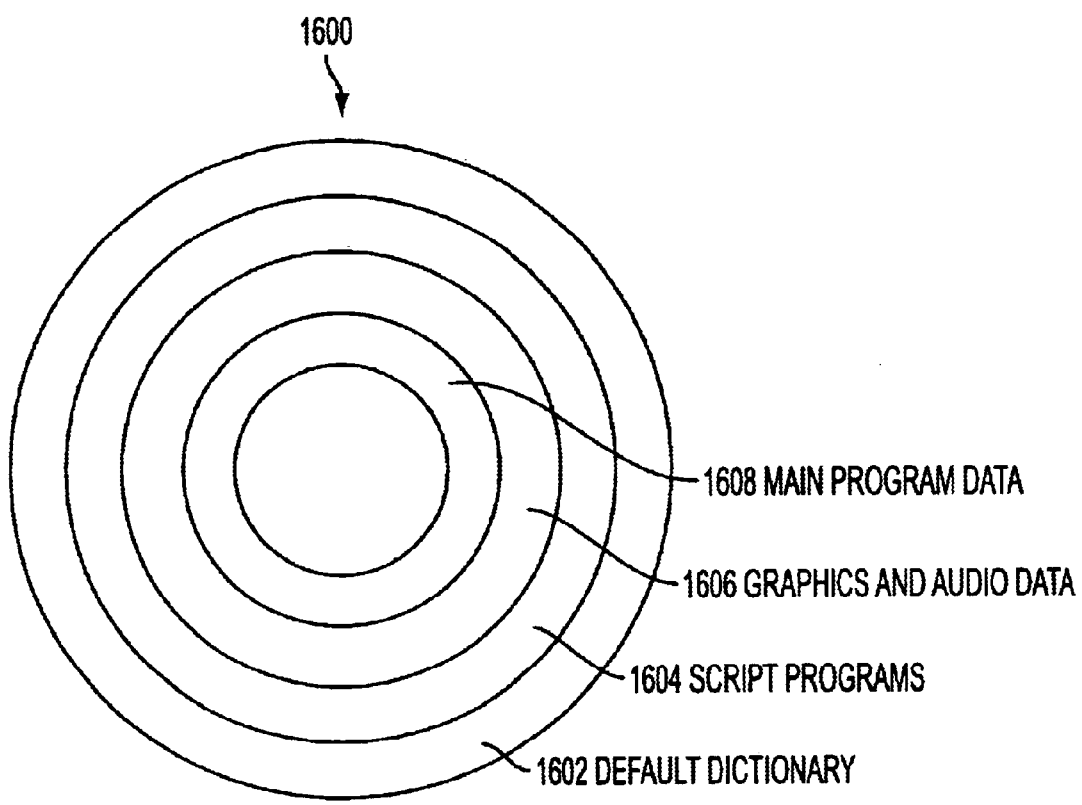
FIG. 16 is a diagram depicting the layout of data of the present invention on an optical disk.

FIG. 16 shows the information and attributes for the plurality of pets stored on a recording medium such as an optical disk 1600. The outer portion 1602 of disk 1600 contains a default dictionary. The default dictionary is used to provide the pet with an initial set of words and attributes associated with those words for the beginning of the game. Portion 1604 contains sets of script programs which are used to generate the sentences used by the pet during conversation. In the preferred embodiment, there are 15 sets of script programs for each character; of course any number of scripts are envisioned without departing from the scope of the present invention. Therefore, if, for example, there were 5 characters to choose from, there would be a total of 75 sets of script programs stored. Graphics and audio data are stored in portion 1606. Graphics and audio data provide for the appearance and sounds associated with the virtual pets. The pets can appear as a dog, a cat, etc, or any other real or fictional creature. Also, stored on the disk 1600 is the main program data at 1608.

As previously noted, the recording medium is not limited to an optical disk, but may be any means for appropriately storing an application program. So-called floppy disks, RAM, ROM and functional equivalents thereof are all suitable. Further, a communications link, such as telephony related, cable television, satellite, RF, microwave, the Internet or World Wide Web or other known mediums, may be used to supply the necessary information, attributes and program. Other data, such as a completely different game, may also be located on the recording medium.

Figure 17:
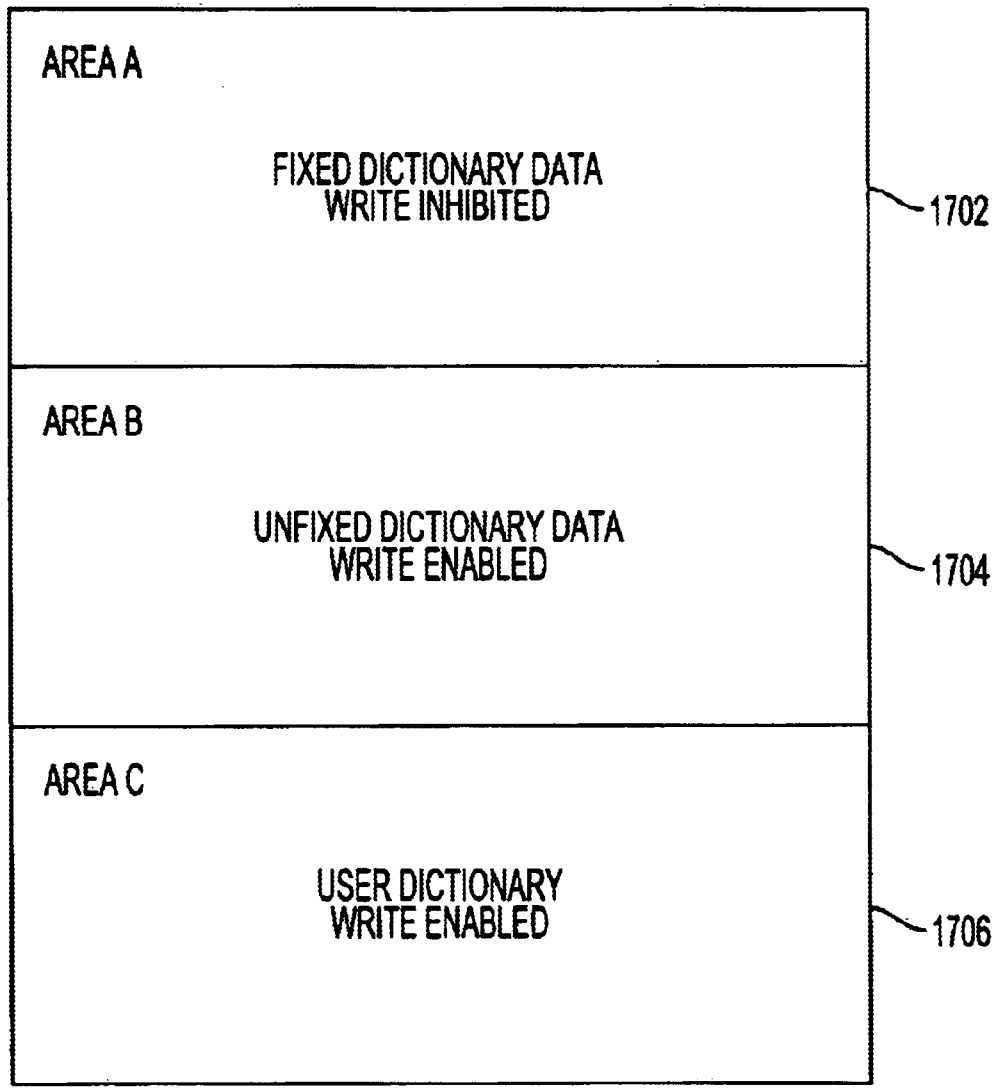
FIG. 17 is a diagram illustrating the layout of dictionary data in the memory of portable device.

After a user selects a pet, information and attributes associated with the pet are downloaded to slave 100. The default dictionary is downloaded and stored in non-volatile memory 46. An arrangement of the default dictionary stored in non-volatile memory 46 is shown in FIG. 17. Area A 1702 contains fixed dictionary data. As area A 1702 is fixed and write inhibited, this dictionary data cannot be modified. Area B 1704 contains unfixed dictionary data and can be modified as described below. Areas A 1702 and B 1704 are provided by the download of the default dictionary. In addition, a third area, Area C 1706, is reserved in non-volatile memory 46 for storing a user dictionary, resultant from taught words and further conversations using the taught words as briefly described above, and further described below. In the preferred embodiment, Area A 1702 contains up to 80 words and Area C 1704 and Area B 1706, combined, contain up to 196 words; however, the actual number can be selected based on storage limitations, size of words, language selected, etc.

As previously stated, Area B 1704 can be modified. When the number of words taught to the virtual pet exceeds the available space provided in Area C 1706, the excess words replace words previously provided in Area B 1704. The words in Area B 1704 are prioritized based upon the frequency of use. The words are replaced in descending order of use, in other words, least frequently used (LRU).

FIG. 18 shows an exemplary set of dictionary data. Words that make up the dictionary 1802–1810 are associated with attributes 1812–1824 by the use of status flags at the intersection of the particular word and attribute. Status flag is taken to mean an entry exists in the boxes at the intersection of the word and attribute. For objective attributes, either the word has the attribute or it doesn't, e.g. the meaning of the word, a status flag of 1 at the intersection, indicates that the word has that attribute. Using the word candy 1802 to illustrate this, the word candy 1802 has a status flag of a 1 at the intersection of candy 1802 and food 1814, which indicates candy is a food. A 0 is placed in the slot for human 1812 and creature 1816, indicating the word candy is not a human, nor a creature. Thus, the word only has one meaning from objective attributes human 1812, food 1814, and creature 1816. Other than attributes, which the word either is or isn't, subjective attributes are also used. For subjective attributes such as like 1820 or need 1824, the word may have a degree of association. For instance, the pet may ask the user "How much do you like candy?" and the user indicates that they like candy a lot. Likewise, the user may indicate they do not like computers. The status flags indicate these degrees. For candy 1802, the status flag of 6 associated with like 1820 indicates the user likes candy a lot, whereas the user's dislike for computers is indicated by a "–5". Not only are these attributes set according to the user teaching the pet the word, but they are also modified through further conversations between the user and pet. Additionally, the date the word was entered or modified is also recorded.

It should be noted, that while the dictionary data has been illustrated in tabular form for sake of understanding, actual implementation of the dictionary data in other known forms is acceptable. As one skilled in the art would appreciate, during implementation of the dictionary data in memory or recording, a different form may be adopted so as to more efficiently utilize space, or a different form may be adopted by the very nature of the architecture of memory or recording medium.

Figure 19:
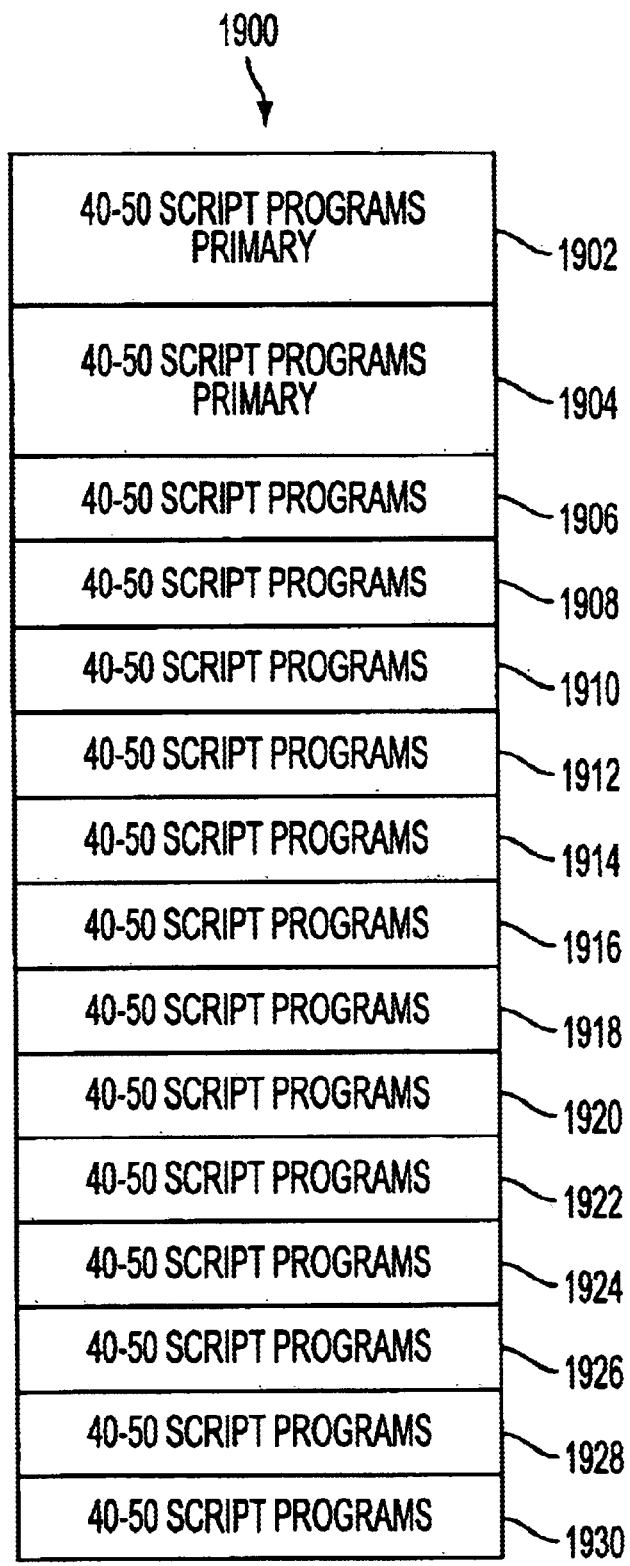
FIG. 19 is a diagram useful in describing the script programs and their use to create conversations.

In order to provide conversation, the virtual pet uses the dictionary and script programs. The script programs are a plurality of sentences having "blanks" which are filled in by choosing words from the dictionary based upon the attributes of the word as is described further below. As shown in FIG. 19, the script programs are grouped into sets 1902–1930. Each pet has 15 sets 1900 of script programs. While each pet has 15 sets of script programs, typically some smaller subset is downloaded to portable device 100. Of the 15 sets, two are designated as primary sets 1902, 1904; upon initial download, primary sets 1902, 1904 are selected with one of the two primary sets chosen randomly to be downloaded. After executing a number of plays and as more words are learned, the other scripts are utilized. Once it is determined that the primary sets no longer need to be utilized, further downloads include additional subsets of scripts chosen randomly.

FIG. 20 illustrates an example of a typically script program. At the start of the program, a search is made for words having certain attributes. As shown at step 1, a search is made for a word meaning "moving", which has a flag indicating the pet likes it and is absent a flag indicating the player likes it. At step 2 another search is performed to determine a word having a flag for "human" and a flag for "lover". After the words have been selected, the pet is displayed and a sentence is displayed, as seen in steps 3 and 4. The sentence of the script programs has one or more "blanks" which are filled by one or more of the words located in the initial steps. The "blanks" are illustrated in step 4 by the brackets. For instance, when addressing the player, the pet will insert the players name into the sentence indicated by {player}. Within the same sentence, the word located in step 1 is positioned in the sentence at the location indicated by {the word sought in step 1}. After displaying the question of step 4, the user is given a choice of responses on display section 130 of slave 100. In this example, the user is given the choice of yes or no, or like or dislike. The user then selects their choice by actuating input means 43 of slave 100. Depending upon the choice made, the script program continues. If the user answered no, or dislike, the flow would move to step 5, otherwise, if the answer was yes, or like, flow would continue to step 9. During the course of the rest of the conversation, the pet may ask more questions, or provide comments. By asking the question in step 4, and receiving an answer from the user, one of the attributes associated with the word located in step 1 is modified based upon the answer provided by the user.

To insure use of the additional sets of script programs of the pet so as to continue to provide excitement and interest to the user, it is advantageous to implement the limitation of periodic redownloading. For instance, a redownload at some fixed period of time, e.g. at least once every eleven days, is implemented. To provide incentive to the player to redownload, after 11 days has expired, and after being reminded to download, the user is unable to communicate with the pet. Also to help insure playing, a certain time interval (threshold) is established, which if such time passes and the user has not played with the pet, the pet "calls" the user, by causing, for example, some audible output from slave 100. However, it is desirable to be able to disable the calling feature, for times when the user is in class, at a meeting, etc.

Figure 21:
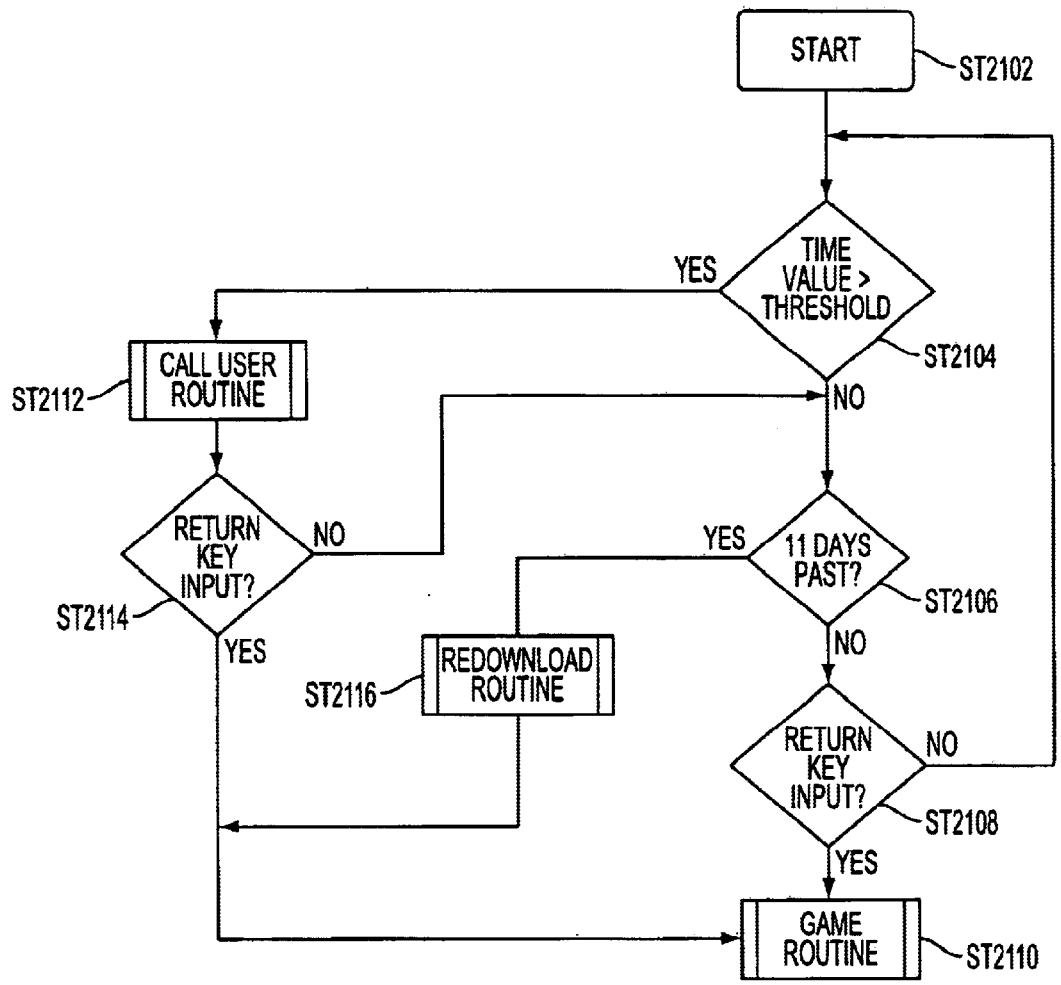
FIG. 21 is a flowchart showing the flow of the main routine, used in the portable device, of the present invention.

FIG. 21 illustrates a program flow of a main routine used to control these features. The flow starts at step ST2102 and proceeds to step ST2104 where the elapsed time since last play is compared with the threshold to determine whether the elapsed time since last play is greater than the threshold. If this is the case, flow moves to step ST2112. At step ST2112 a call user routine is performed, which simply "calls" the user and moves to step ST2114 which determines whether the user responds to the call by actuating input means 43. If the user responds, flow is moved to the game routine at step ST2110. If the user does not respond, flow moves to the same point of flow that would have occurred had the elapsed time not been greater than the threshold.

From this point, flow moves to step ST2108 where it is checked whether 11 days have past. If this is the case, the redownload routine is initiated, otherwise a check is made to determine if an input key is pressed ST2108. If the user has actuated input means 43 then the game routine is called ST2110, otherwise flow is returned to the beginning.

Figure 22:
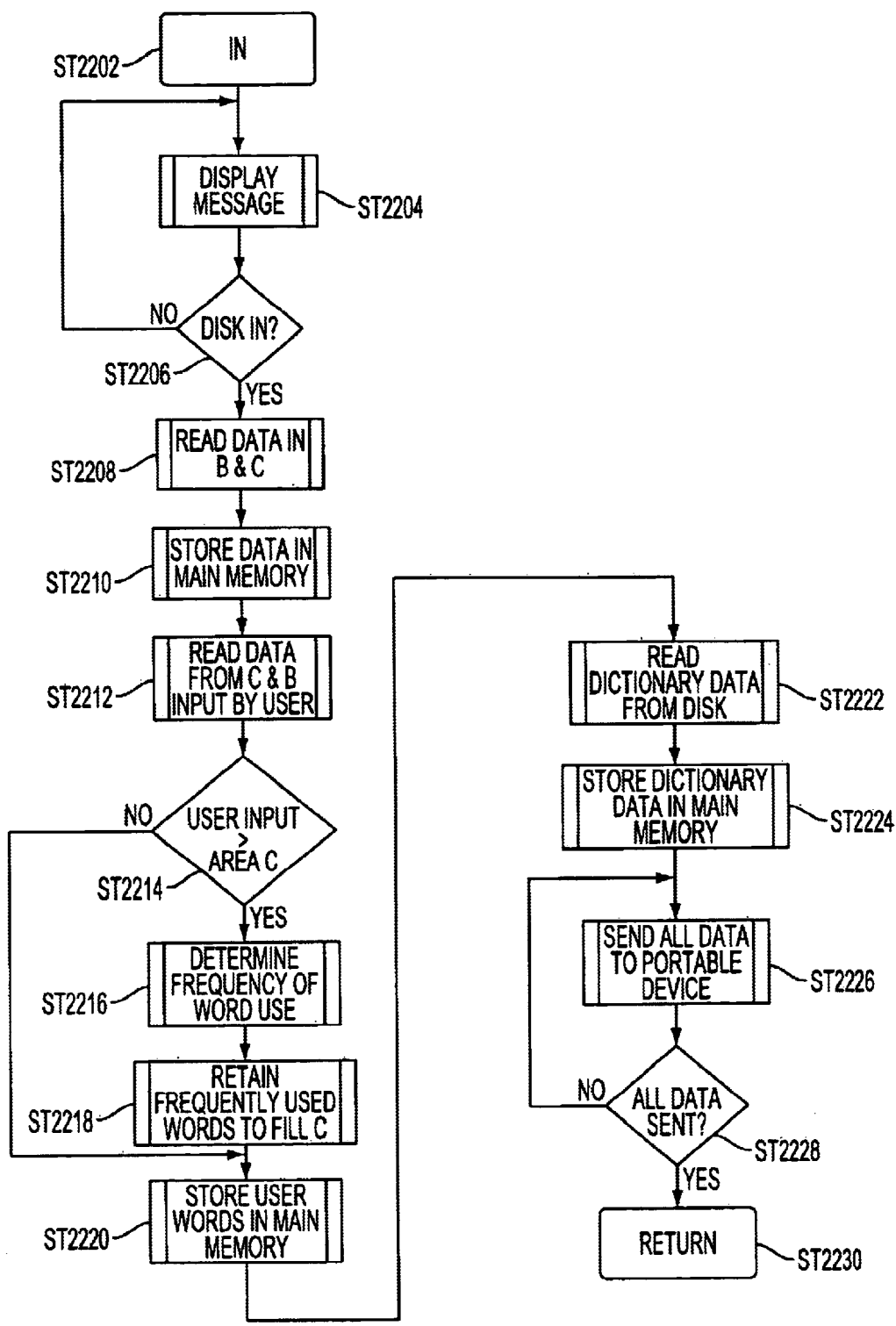
FIG. 22 is a flowchart of the redownloading routine.

The redownload routine is illustrated in FIG. 22. The routine is entered at step ST2202 and proceeds to ST2204 where a message is displayed. The message reminds the user to redownload and to insert the optical disk containing the application program into the master. As part of the message, the display of the slave shows the pet disappearing, as if the pet has run away from home, and the user is unable to communicate with the pet. Alternatively, the pet running away is displayed on the display of associated with the master 1 when the slave 100 is redocked. After the user has redocked the slave 100 with the master 1 and inserted the recording medium containing the application program, flow moves to step ST2208. At ST2208, the data located in Areas B 1704 and Areas C 1706 of the non-volatile memory 46 of slave 100 are read and stored in the memory of master 1 at step ST2210, i.e., the data is downloading from slave 100 to master 1. The master 1 then reads this data and determines if the number of user taught words exceeds the space of Area C 1706. As previously described, during play, when the number of user taught words exceeds the space of Area C 1706, the new words replace words located in unfixed Area B 1704.

However, during redownload, the dictionary data downloaded to Areas A 1702 and Areas B 1704 is the default dictionary data. Therefore, the new words previously stored in Area B 1704 cannot be placed back to Area B 1704. While this causes an incomplete set of user input words to be redownloaded back to Area C 1706, it is desirable to insure the most frequently used words are not deleted upon redownload. To rectify such, the frequency of use of the user input words from Areas A 1704 and Areas C 1706 is determined and the words are retained based upon such frequency, from the most frequent to least frequent, until the number of words retained equal the number that are accommodated by the space of Area C 1706, steps ST2216 and ST2218. The retained words are stored in memory at ST2220 and the default dictionary data is read and stored in memory at steps ST2222 and ST2224. Once the complete data is compiled in memory it is downloaded to slave 100 until complete, at which time flow returns to the main routine, steps ST2226, ST2228, ST2230.

Figure 23:
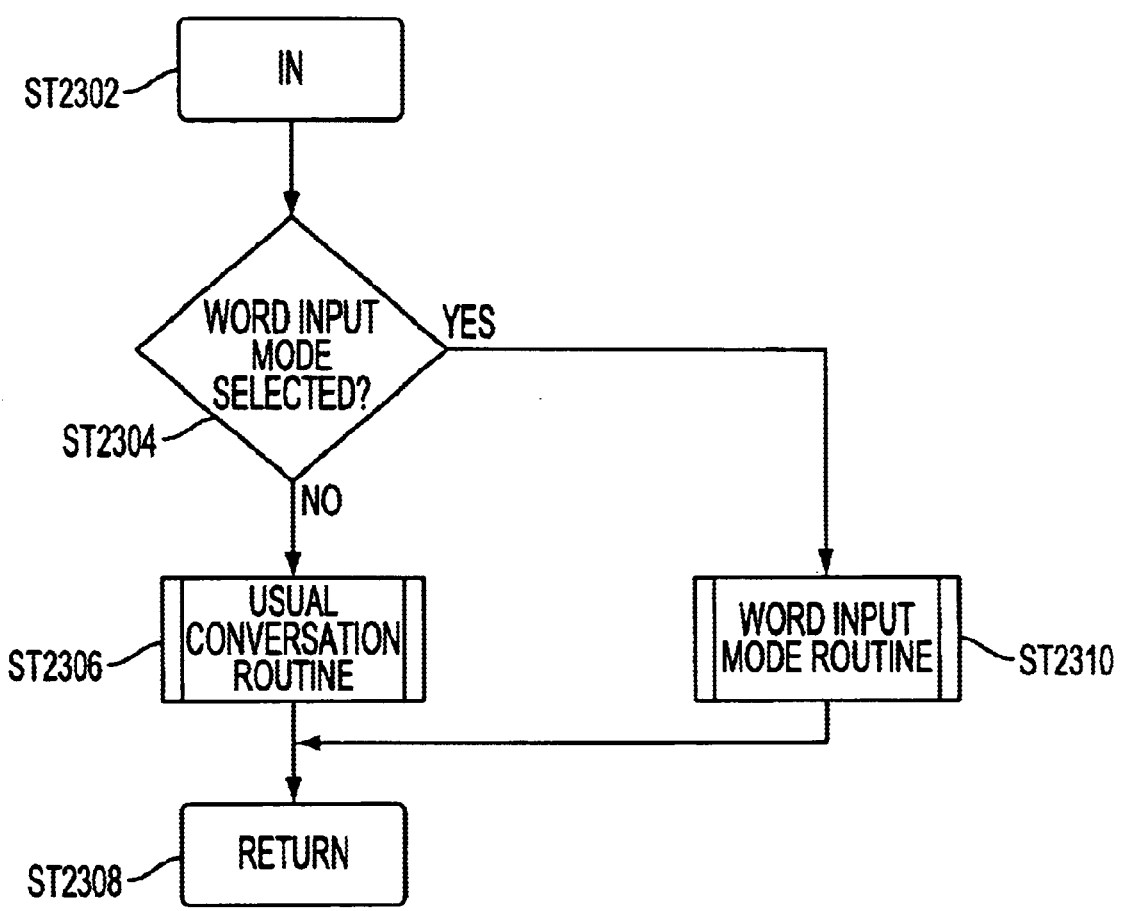
FIG. 23 is a flowchart of the game routine.

Next the game routine will be described and is illustrated in FIG. 23. The flow is entered at step ST2302 and determination whether the user wishes to input new words or whether to play the usual conversation game, step ST2304. If the user chooses to input new words, word input routine is called at ST2310, and alternatively if the user decides on the usual conversation, usual conversation routine is called at ST2306. After the completion of either routine, flow returns to the main routine at step ST2308.

Figure 24:
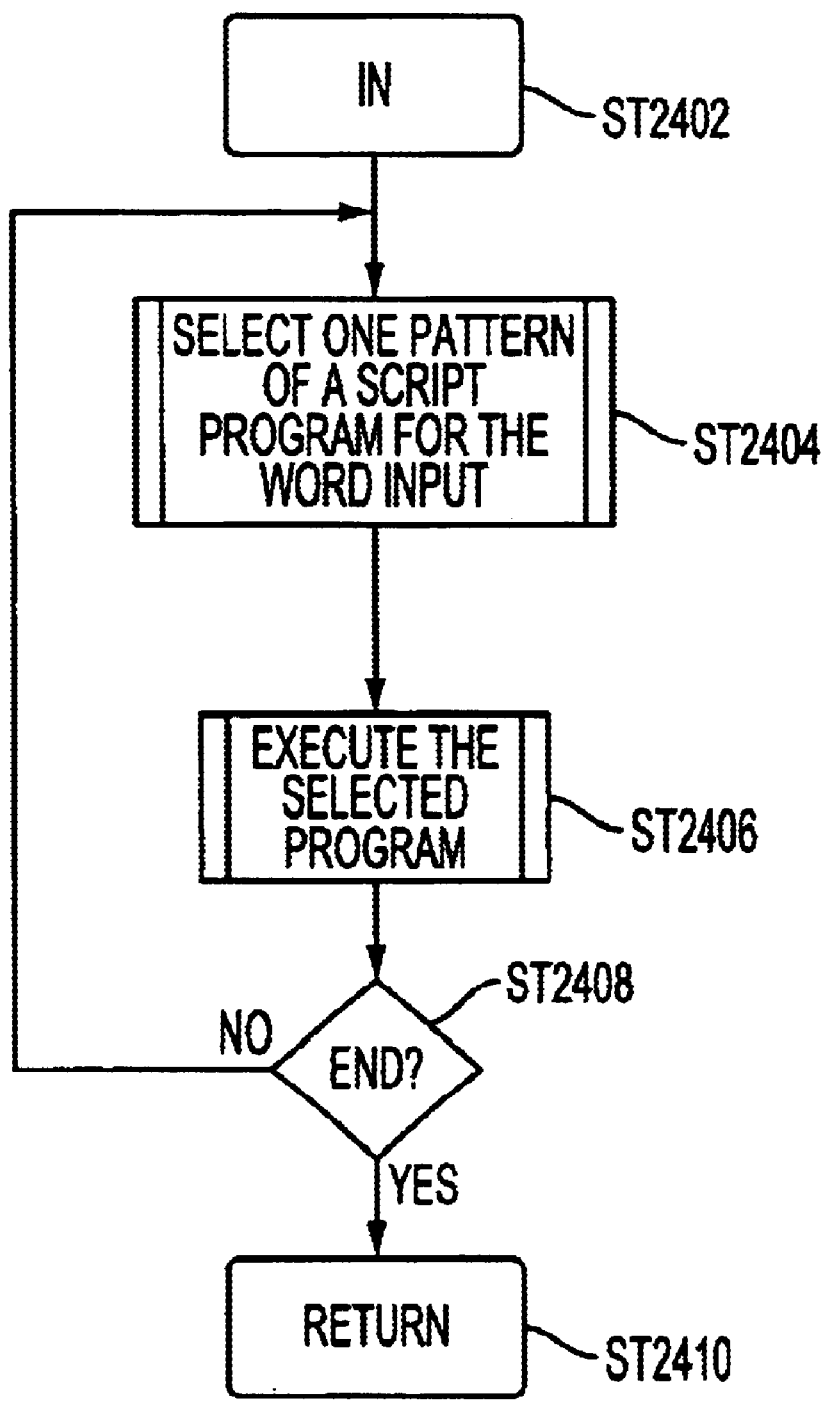
FIG. 24 is a flowchart of the word input routine.

The word input routine is illustrated in FIG. 24. As described in conjunction with FIG. 2, there are 15 sets of script programs associated with a pet. For each set, there is a specific pattern of questions relating to setting a new word. In this manner, it is possible to make entering new words more interesting for the user. The sets are broken into two primary sets for relatively new users, 8 intermediate sets and 5 advanced sets. Rather than engage in the same set of questions when setting a word, there are potentially 15 different ways of setting the word depending on which set of scripts is chosen. By choosing the sets randomly, the user cannot expect what will be asked, and therefore interest is maintained. After the word input routine is entered ST2402, the next step ST2404 selects one pattern of a script program for the word input. Next the selected program is executed until it is completed ST2406. At step ST2408, a determination is made as to whether or not the user wishes to continue inputting words or not. If the user continues to input words, the flow is returned to the beginning of the routine, otherwise the flow is returned to the game routine ST2410.

Figure 25:
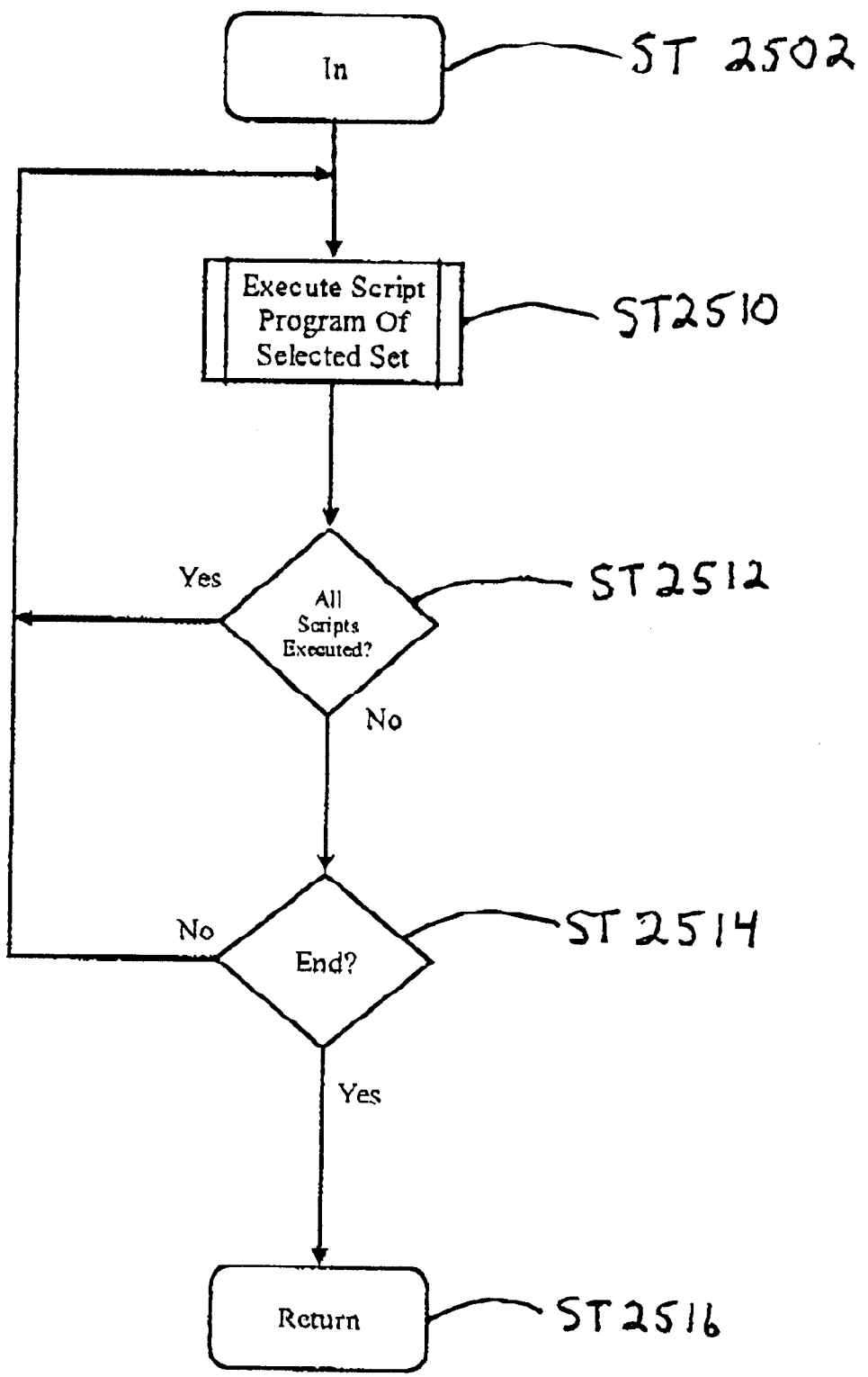
FIG. 25 is a flowchart of the usual conversation routine.

As stated previously, if the player chose to play the usual conversation game, the usual conversation routine is called. Usual conversation routine is illustrated in FIG. 25. The flow is entered at ST2502. Script programs within the set are selected at random and executed until all the scripts are executed, steps ST2510 and ST2512. At step ST2514 a determination is made as to whether the user wishes to end the usual conversation game, and if so flow is returned back to the game routine ST2516, otherwise flow goes back to the beginning of the routine.

Figure 26:
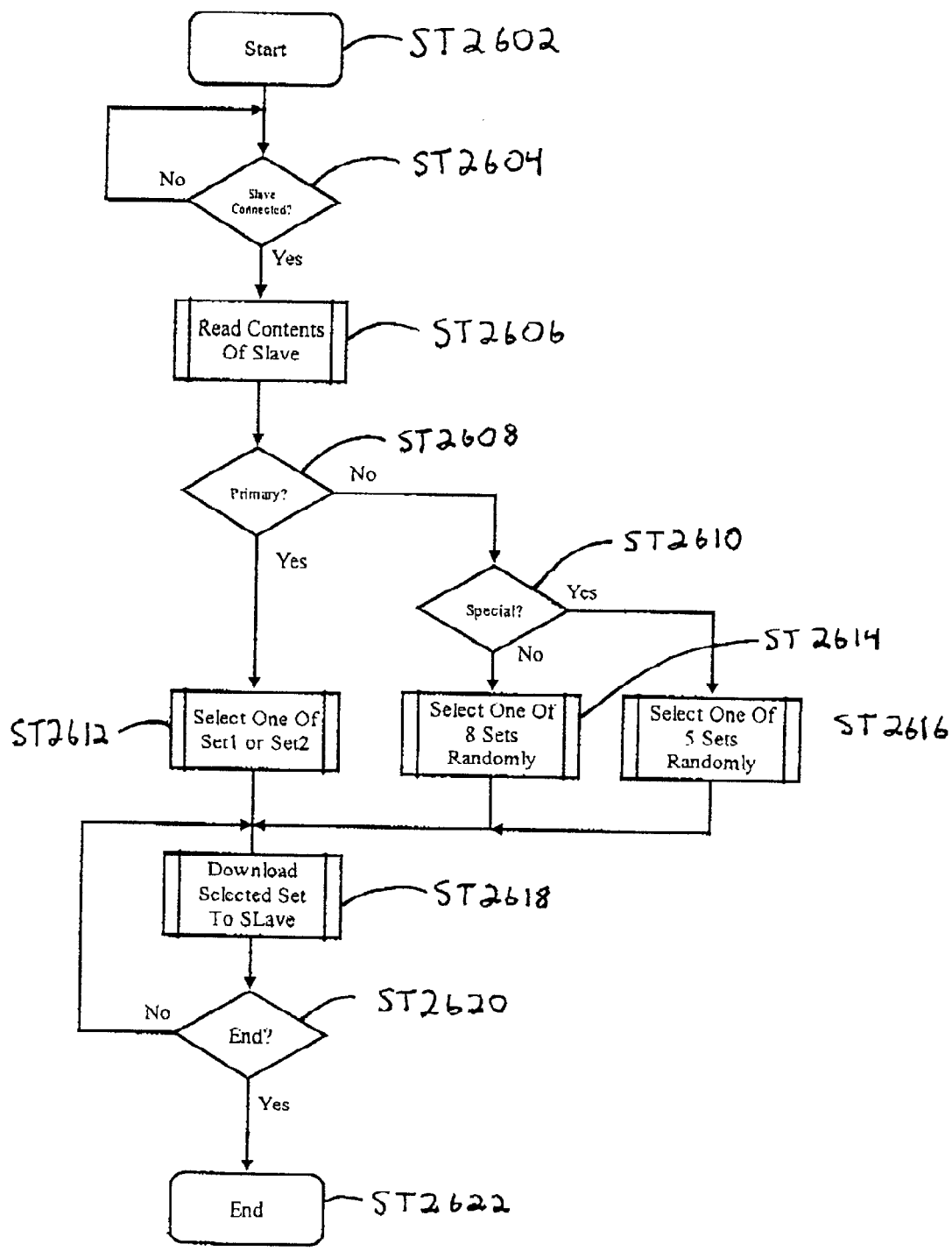
FIG. 26 is a flowchart of the set selection and downloading.

As previously stated, which set of script programs downloaded to slave 100 from the master 1 is dependent on the number of times the user has interacted with the pet. Specific partitioning and selection criteria based on use can be arbitrarily chosen without departing from the scope of the present invention. FIG. 26 shows the program flow for selecting which set to download to slave 100. In the preferred embodiment, this flow is implemented in the main program located on the master 1.

The flow starts at ST2602 and moves to a determination of whether or not the slave 100 is connected, ST2604. When it is determined that slave 100 is connected to master 1 a decision as to whether or not the primary sets are to be used is made, ST2608. The use of the primaries is determined by the number of words that the user has taught the pet.

If the primaries are still being used, one of the primary sets is selected, ST2612. If the primaries are no longer being used, a determination is made as to whether or not the intermediate or advanced special sets are to be used, ST2610. The advanced special sets are used when a player converses with the pet often. If the advanced special sets are to be used, flow moves to step ST2616, where one of the five special sets are selected, otherwise a selection of one of the eight intermediate scripts is chosen, ST2614. After a selection of the script is mad, the script is downloaded to the slave 100, ST2618, until the download is completed, ST2620. After download, the routine is ended, ST2622.

In another embodiment of the present invention, other game features are provided to increase interest and enjoyability by the user. One such feature, is the capability of the user to give their pet gifts. By redocking slave 100 with master 1, the user can select from a plurality of gifts to give to their pet. The type of gift changes over time and the course of the seasons, therefore the selection of gifts changes. If the user gives too many presents to their pet, the pet becomes spoiled and this shows up in the attitude of questions asked as well as what the pet writes in their dairy (described below).

Using the wireless communication means 48, two users can allow their pets to "talk" to each other. The slaves are pointed towards each other to enable the wireless link to connect. When the two pets are "talking", identification information is transferred between the slaves. Thereafter, users are able to redock the slave 100 in master 1 and determine on a chart, the list of the pet's friends.

As mentioned above, the pet has a diary. Each day the pet writes a message into its diary for the user. In this manner, the pet can let the user know its feelings. For example, the pet may write that "the user did not play with it today", that "the user hasn't played with it in a while", or it may write "it is lonely". Additionally, there are periods of time, such as when the pet is sleeping, when the user cannot converse with the pet.

CONCLUSION

A system and method has been shown in the above embodiments for the effective implementation of a portable electronic device which retains an interactive conversation mode with limited learning capabilities and downloading features with a main entertainment station. While various preferred embodiments have been shown and described, it will be understood that there is no intent to limit the invention by such disclosure, but rather, is intended to cover all modifications and alternate constructions falling within the spirit and scope of the invention as defined in the appended claims. For instance the invention is not limited to the specific virtual pet preferred embodiment details but can include other equivalent conversational and downloading features. The hardware and software required elements and methods could be substituted with equivalent elements or methods as is known in the art.

What is claimed is:

1. A comnunuication apparatus between a user and an entertainment apparatus, the entertainment apparatus having at least a microprocessor, memory, display controller and means for inputting user commands, said communication apparatus comprising:

an electronic dictionary comprising words and associated status information related specifically to said words;

an alteration element to modify the status information of one or more words based on user interaction with said entertainment apparatus;

a sentence generator creating a sentence including said one or more words and based on said modified electronic dictionary word status information associated with said one or more words and adapted to a situation between a user and said entertainment apparatus, and a sentence output element for outputting a sentence generated by the sentence generator to display as a message to a user.

2. A communication apparatus, as per claim 1, wherein said electronic dictionary is stored in electronic memory within a portable electronic device.

3. A communication apparatus, as per claim 2, wherein said electronic dictionary comprises a plurality of demarcated storage areas.

4. A communication apparatus, as per claim 3, wherein said plurality of demarcated storage areas comprise at least a write protected area for storing a first set of words, a first write enabled area and a second write enabled area for storing user input words.

5. A communication apparatus, as per claim 4, wherein additional user input words, exceeding a storage capacity of said second write enabled area, are stored within said first write enabled area.

6. A communication apparatus, as per claim 4, wherein storage of said additional user input words, exceeding a storage capacity of said second write enabled area, are stored within said first write enabled area by overwritting least frequently used words previously stored therein.

7. A communication apparatus, as per claim 1, wherein said alteration element to modify the status of one or more words based on user input comprises said user defining a meaning of a word based on one or more categories, said status information indicating that at least one category has been selected.

8. A communication apparatus, as per claim 1, wherein the electronic dictionary stores user input words with their status information, and further comprising:
    a register for recording a word input by said user to the dictionary if the word is not register.

9. A communication apparatus, as per claim 2, wherein said communication apparatus further comprises a plurality of portable electronic devices, each of said portable electronic devices retaining at least a portion of said electronic dictionary.

10. A communication apparatus, as per claim 9, wherein said plurality of portable electronic devices communicate with each other.

11. A communication apparatus, as per claim 10, wherein said plurality of portable electronic devices communicate with each other using wireless communication standards.

12. A communication apparatus, as per claim 11, wherein wireless communication standards include at least infrared signals.

13. A communication apparatus, as per claim 1, wherein said communication apparatus embodies an animated character.

14. A communication apparatus, as per claim 13, wherein said communication apparatus embodies a virtual pet.

15. A communication apparatus between a user and an entertainment apparatus, the entertainment apparatus having at least a microprocessor, memory, display controller and means for inputting user commands, said communication apparatus comprising:
    an electronic dictionary comprising word data and associated status information; an alteration element to modify the status of one or more word data elements based on user input;
    a sentence generator creating a sentence based on said electronic diction word data status and adated to a situation between a user and said entertainment apparatus, and
    a sentence output element for outputting a sentence generated by the sentence generator to display as a message to a user,
    wherein said electronic dictionary is stored in electronic memory within a portable electronic device,
    wherein said electronic dictionary comprises a plurality of demarcated storage areas,
    wherein said plurality of demarcated storage areas comprise at least a write protected area for storing a first set of words, a first write enabled area and a second write enabled area for storing user input words, and
    wherein additional user input words, exceeding a storage capacity of said second write enabled area, are stored within said fist write enabled area.

16. A communication apparatus between a user and an entertainment apparatus, the entertainment apparatus having at least a microprocessor, memory, display controller and means for inputting user commands, said communication apparatus comprising:
    an electronic dictionary comprising word data and associated information; an alteration element to modify the status of one or more word data elements based on user input;
    a sentence generator creating a sentence based on said electronic dictionary word data status and adapted to a situation between a user and said entertainment apparatus, and
    a sentence output element for outputting a sentence generated by the sentence generator to display as a message to a user,
    wherein said electronic dictionary is stored in electronic memory wit a portable electronic device,
    wherein said electronic dictionary comprises a plurality of demarcated storage areas,
    wherein said plurality of demarcated storage areas comprise at least a write protected area for storing a first set of words, a first writs enabled area and a second write enabled area for storing user input words, and
    wherein storage of said additional user input words, exceeding a storage capacity of said second write enabled area, are stored within said first write enabled area by overwriting least frequently used words previously stored therein.

17. A method of a updating an electronic dictionary for a communication program, said communication program interacting between a portable apparatus having at least a CPU, a memory for storing the electronic dictionary, a display device, a timer and input device manipulated by a user, and an entertainment apparatus having at least a CPU, memory, display controller and input device, the communication program downloaded from a medium set on the entertainment apparatus to the portable apparatus to be executed on the portable apparatus, the electronic dictionary having at least a write protected area for storing a first set of words, a first write enabled area and a second write enabled area for storing user input words including the steps of:
    reading said dictionary in said portable apparatus;
    selecting user input words stored in at least said second write enabled area;
    transferring said selected words to said entertainment apparatus;
    reading said first set of words from said medium, and
    downloading said first set of words and the selected user input words from the entertainment apparatus to the portable apparatus to thereby restore the first set of words and the selected user input words from the entertainment apparatus into the memory of the portable apparatus,
    wherein after completion of said restoring step, additional user input words, exceeding a storage capacity of said second write enabled area, are stored within said first write enabled area.

18. A method of a updating an electronic dictionary for a communication program, said communication program interacting between a portable apparatus having at least a CPU, a memory for storing the electronic dictionary, a display device, a timer and input device manipulated by a user, and an entertainment apparatus having at least a CPU, memory, display controller and input device, the communication program downloaded from a medium set on the entertainment apparatus to the portable apparatus to be executed on the portable apparatus the electronic dictionary having at least a write protected area for storing a first set of words, a first write enabled area and a second write enabled area for storing user input words including the steps of:
    reading said dictionary in said portable apparatus;
    selecting user input words stored in at least said second write enabled area;
    transferring said selected words to said entertainment apparatus, reading said first set of words from said medium, and downloading said first set of words and the selected user input words from the entertainment apparatus to the portable apparatus to thereby restore the first set of words and the selected user input words from the entertainment apparatus into the memory of the portable apparatus, wherein storage of said additional user input words, exceeding a storage capacity of said second write enabled area, are stored within said first write enabled area by overwriting least frequently used words previously stored therein.

19. A method of providing interactive conversation between a first electronic device and a user, said method comprising the steps of:

providing a dictionary having at least one word, said at least one word having at least one attribute associated with said word;

generating sentences using said dictionary and at least one set of script programs, said script programs determining at least one word of said dictionary having at least one specified attribute and inserting said word having at least one specific attribute into at least one specified portion of a predefined sentence; receiving an input;

modifying at least one attribute associated with at least one word of said dictionay based upon said input;

partitioning said words of said dictionary into a first portion second portion and third portion, said third portion storing new words;

adding new words to said dictionary, said new words being added to said third portion until said third portion is filed; and replacing said words of said second portion with additional new words once said third portion is filled.

20. A method of providing interactive conversation between a first electronic device and a user, said method comprising:

providing a dictionary having at least one word, said at least one word having at least one attribute associated with said word;

generating sentences using said dictionary and at least one set of script programs, said script programs determining at least one word of said dictionary having at least one specified attribute and inserting said word having at least one specific attribute into at least one specified portion of a predefined sentence;

receiving an input, modifying at least one attribute associated with at least one word of said dictionary based upon said input;

determining frequency of use of said new words; and periodically discarding a portion of said new words based upon said frequency of use;

wherein said retained portion of said new words is capable of being completely placed in said third portion and said replaced words of said second portion are restored.

21. A method of providing interactive conversation between an electronic device and a user, as per claim 20, wherein said periodically discarding a portion step occurs during a reloading of said dictionary.

22. A first electronic device providing interactive conversation between a user and said electronic device comprising:

a dictionary having at least one word, said word having at least one attribute associated with said word;

at least one set of script program, said script programs determining at least one word of said dictionary having at least one specified attribute and inserting said word having at least one specified attribute into at least one specified portion of a predefined sentence;

an output outputting said predefined sentence having said word having at least one specified attribute inserted into said specified portion;

an input receiving in response to said outputted sentence; and an interface for interfacing said first electronic device to a second electronic device, said second electronic device capable of providing a default dictionary to said first device;

wherein at least one attribute associated with at least one word of said diction is modified based upon said input;

wherein said dictionary is partitioned into at least a first part, a second part and a third part; said first part contains at least one word of said default dictionary provided by said second electronic device; said second part initially contains at one or more words of said default dictionary; said third part receives at least one new word added to said dictionary;

wherein said one or more words of said second part are capable of being replaced by additional new words upon said third part being incapable of receiving said at least one new word; and said at least one word of said first part is incapable of being replaced by additional new words.

23. A first electronic device providing interactive conversation between a user and said electronic device, as per claim 22, wherein upon said second electronic device providing said default dictionay to said first electronic device a determination is made of least frequently used words stored in said third part and said at least one word replacing words in said second part, and retaining the most frequently used words from this group in truncated form limited to a capacity of the third part.

24. A first electronic device providing interactive conversation between a user and said electronic device, as per claim 22, wherein said conversation is between said user and at least one animated character of said first electronic device.

25. A first electronic device providing interactive conversation between a user and said electronic device, as per claim 22, wherein said abated character is a virtual pet.

* * * * *